United States Patent
Bass, II et al.

(10) Patent No.: US 8,175,992 B2
(45) Date of Patent: May 8, 2012

(54) METHODS AND SYSTEMS FOR COMPOUND FEATURE CREATION, PROCESSING, AND IDENTIFICATION IN CONJUNCTION WITH A DATA ANALYSIS AND FEATURE RECOGNITION SYSTEM WHEREIN HIT WEIGHTS ARE SUMMED

(75) Inventors: Robert Leon Bass, II, Decatur, GA (US); Bryan Glenn Donaldson, Cumming, GA (US); Nicholas Levi Middleton, Cartersville, GA (US); Robert M. Brinson, Jr., Rome, GA (US)

(73) Assignee: Intelliscience Corporation, Atlanta, GA (US)

( * ) Notice: Subject to any disclaimer, the term of this patent is extended or adjusted under 35 U.S.C. 154(b) by 651 days.

(21) Appl. No.: 12/405,993

(22) Filed: Mar. 17, 2009

(65) Prior Publication Data
US 2009/0231359 A1 Sep. 17, 2009

Related U.S. Application Data

(60) Provisional application No. 61/037,266, filed on Mar. 17, 2008.

(51) Int. Cl.
*G06F 17/00* (2006.01)
(52) U.S. Cl. ......................................................... 706/45
(58) Field of Classification Search .................... 706/12, 706/21, 45–47; 382/155–161
See application file for complete search history.

(56) References Cited

U.S. PATENT DOCUMENTS

| | | | |
|---|---|---|---|
| 5,267,328 A | 11/1993 | Gouge | |
| 5,319,719 A | 6/1994 | Nakazawa et al. | |
| 5,826,261 A | 10/1998 | Spencer | |
| 5,892,838 A | 4/1999 | Brady | |
| 6,058,322 A | 5/2000 | Nishikawa et al. | |
| 6,067,371 A | 5/2000 | Gouge et al. | |
| 6,122,396 A | 9/2000 | King et al. | |
| 6,373,984 B1 | 4/2002 | Gouge et al. | |
| 6,381,372 B1 * | 4/2002 | Loce | 382/261 |
| 6,396,939 B1 | 5/2002 | Hu et al. | |

(Continued)

FOREIGN PATENT DOCUMENTS
WO    2008022222    2/2008

OTHER PUBLICATIONS

"Artifical Neural Network," Wikipedia, http:/en.wikipedia.org/wiki/artificial_neural_network; pp. 1-10, Aug. 2005.

(Continued)

*Primary Examiner* — David Vincent
(74) *Attorney, Agent, or Firm* — Lowe Graham Jones PLLC

(57) ABSTRACT

Methods and systems for creation, processing, and use of compound features during data analysis and feature recognition are disclosed herein. In a preferred embodiment, the present invention functions to apply a new level of data discrimination during data analysis and feature recognition events such that features are more easily discerned from the remainder of the data pool using processing techniques that are more conducive to human visualizations, perceptions, and/or interpretations of data. This is accomplished using an example tool that allows previously processed and identified features (hereafter "known features") to be aggregated so as to aid the system in recognizing abstract data features, preferably using Boolean operators and user-assigned hit weight values across desired cluster ranges surrounding analyzed data elements.

17 Claims, 33 Drawing Sheets

U.S. PATENT DOCUMENTS

| | | | |
|---|---|---|---|
| 6,463,163 | B1 | 10/2002 | Kresch |
| 6,574,378 | B1 | 6/2003 | Lim |
| 6,601,059 | B1 | 7/2003 | Fries |
| 6,625,585 | B1 * | 9/2003 | MacCuish et al. ............... 706/10 |
| 6,829,384 | B2 * | 12/2004 | Schneiderman et al. ..... 382/154 |
| 6,985,612 | B2 | 1/2006 | Hahn |
| 7,092,548 | B2 | 8/2006 | Laumeyer et al. |
| 7,162,076 | B2 | 1/2007 | Liu |
| 7,187,790 | B2 | 3/2007 | Sabol et al. |
| 7,203,360 | B2 | 4/2007 | Lee et al. |
| 7,295,700 | B2 | 11/2007 | Schiller et al. |
| 7,362,892 | B2 | 4/2008 | Lewis et al. |
| 7,492,938 | B2 | 2/2009 | Brinson, Jr. et al. |
| 7,751,602 | B2 | 7/2010 | Collins et al. |
| 7,773,781 | B2 * | 8/2010 | Kim ............................... 382/118 |
| 7,848,566 | B2 * | 12/2010 | Schneiderman ............... 382/159 |
| 7,930,353 | B2 * | 4/2011 | Chickering et al. .......... 709/206 |
| 2002/0168657 | A1 | 11/2002 | Chen et al. |
| 2002/0176113 | A1 | 11/2002 | Edgar |
| 2004/0219517 | A1 | 11/2004 | Ecker et al. |
| 2005/0025355 | A1 | 2/2005 | Simard et al. |
| 2005/0049498 | A1 | 3/2005 | Roche et al. |
| 2006/0024669 | A1 | 2/2006 | Bogoch et al. |
| 2006/0045512 | A1 | 3/2006 | Imamura et al. |
| 2006/0285010 | A1 | 12/2006 | Wang et al. |
| 2007/0044778 | A1 | 3/2007 | Milovanovic et al. |
| 2007/0047785 | A1 | 3/2007 | Jang et al. |
| 2007/0081743 | A1 | 4/2007 | Kim |
| 2007/0140540 | A1 | 6/2007 | McLaren et al. |
| 2007/0195680 | A1 | 8/2007 | Brinson, Jr. et al. |
| 2007/0244844 | A1 | 10/2007 | Brinson, Jr. et al. |

OTHER PUBLICATIONS

Stergiou et al., "Neural Networks," http://www.doc.ic.ac.uk/~nd/surprise_96/journal/wol14/cs11/report.html.pp. 1-29; Aug. 2005.

Rowe et al., "Detection of Antibody to Avian Influenza A (H5N1) Virus in Human Serum by Using a Combination of Serologic Assays," Journal of Clinical Microbiology, pp. 937-943, Apr. 1999.

Sung et al., "Example-Based Learning for Biew-Based Human Face Detection," IEEE Transactions on Pattern Analysis and Machine Intelligence, vol. 20, No. 1, Jan. 1998.

* cited by examiner

|   | 1 | 2 | 3 | 4 | 5 |
|---|---|---|---|---|---|
| 1 | KF1 KF4 KF6 | | | KF2 KF5 | |
| 2 | KF3 | | KF2 KF3 KF6 | KF1 | KF1 |
| 3 | KF1 | KF5 | KF3 | KF2 | |
| 4 | KF1 | | KF6 | KF6 | |
| 5 | KF2 | KF1 KF2 | | | KF6 |

*FIG. 17*

| Parent CF | CF Members | CF Attributes | | Member Attributes | | |
|---|---|---|---|---|---|---|
| | | Cluster Range | Operator | Cluster Count | Negated? | Hit Weight |
| CF1 | KF1 | 1 | AND | 1 | N | 100 |
| | KF2 | | | 1 | N | 100 |
| | KF3 | | | 0 | Y | 100 |
| CF2 | CF1 | 2 | OR | 0 | N | 100 |
| | KF4 | | | 0 | N | 100 |
| | KF5 | | | 0 | N | 50 |
| | KF6 | | | 1 | N | 50 |
| CF3 | CF2 | 1 | XOR | 1 | N | 100 |
| | KF3 | | | 0 | N | 100 |

*FIG. 18*

| Feature | Cluster Range | Processing wave number | | Processing Order |
|---|---|---|---|---|
| CF1 | 1 | (2+1) | 3 | 1 |
| CF2 | 2 | (1+1) | 2 | 2 |
| CF3 | 1 | 1 | 1 | 3 |

*FIG. 19*

| Valid data elements | Data elements in cluster range=1 | KF hit lists | AND KF1 (cluster count=1; hit weight value=100) | | | | AND KF2 (cluster count=1; hit weight value=100) | | | | AND NOT KF3 (cluster count=0; hit weight value=100) | | | | CF1 | |
|---|---|---|---|---|---|---|---|---|---|---|---|---|---|---|---|---|
| | | | Total hit count (for cluster) | Hit count > cluster count? | Member hit weight value | Member hit weight value > 0? | Total hit count (for cluster) | Hit count > cluster count? | Member hit weight value | Member hit weight value > 0? | Total hit count (for cluster) | Hit count > cluster count? | Member hit weight value | Member hit weight value > 0? | All member hit weights > 0? | Hit count |
| (1, 1) | (1, 1) KF1<br>(2, 1) -<br>(1, 2) KF3<br>(2, 2) - | | 1 | F | -100 | F | 0 | F | -100 | F | 1 | F | -100 | F | F | - |
| (4, 1) | (3, 1) -<br>(4, 1) KF2<br>(5, 1) -<br>(3, 2) KF2<br>KF3<br>(4, 2) KF1<br>(5, 2) KF1 | | 2 | T | 100 | T | 2 | T | 100 | T | 1 | F | -100 | F | F | - |
| (1, 2) | (1, 1) KF1<br>(2, 1) -<br>(1, 2) KF3<br>(2, 2) -<br>(1, 3) KF1<br>(2, 3) - | | 2 | T | 100 | T | 0 | F | -100 | F | 1 | F | -100 | F | F | - |
| (3, 2) | (2, 1) -<br>(3, 1) -<br>(4, 1) KF2<br>(2, 2) -<br>(3, 2) KF2<br>KF3<br>(4, 2) KF1<br>(2, 3) -<br>(3, 3) KF3<br>(4, 3) KF2 | | 1 | F | -100 | F | 3 | T | 100 | T | 2 | F | -100 | F | F | - |

*FIG. 20A*

| Valid data elements | Data elements in cluster range=1 | KF hit lists | AND KF1 (cluster count=1; hit weight value=100) | | | | AND KF2 (cluster count=1; hit weight value=100) | | | | AND NOT KF3 (cluster count=0; hit weight value=100) | | | | CF1 | |
|---|---|---|---|---|---|---|---|---|---|---|---|---|---|---|---|---|
| | | | Total hit count (for cluster) | Hit count > cluster count? | Member hit weight value | Member hit weight value > 0? | Total hit count (for cluster) | Hit count > cluster count? | Member hit weight value | Member hit weight valuE > 0? | Total hit count (for cluster) | Hit count > cluster count? | Member hit weight value | Member hit weight value > 0? | All member hit weights > 0? | Hit count |
| (4, 2) | (3, 1) - <br> (4, 1) KF2 <br> (5, 1) - <br> (3, 2) KF2 <br> (3, 2) KF3 <br> (4, 2) KF1 <br> (5, 2) KF1 <br> (3, 3) KF3 <br> (4, 3) KF2 <br> (5, 3) - | | 2 | T | 100 | T | 3 | T | 100 | T | 2 | F | -100 | F | F | - |
| (5, 2) | (4, 1) KF2 <br> (5, 1) - <br> (4, 2) KF1 <br> (5, 2) KF1 <br> (4, 3) KF2 <br> (5, 3) - | | 2 | T | 100 | T | 2 | T | 100 | T | 0 | T | 100 | T | T | 1 |
| (1, 3) | (1, 2) KF3 <br> (2, 2) - <br> (1, 3) KF1 <br> (2, 3) - <br> (1, 4) KF1 <br> (2, 4) - | | 2 | T | 100 | T | 0 | F | -100 | F | 1 | F | -100 | F | F | - |
| (3, 3) | (2, 2) - <br> (3, 2) KF2 <br> (3, 2) KF3 <br> (4, 2) KF1 <br> (2, 3) - <br> (3, 3) KF3 <br> (4, 3) KF2 <br> (2, 4) - <br> (3, 4) - <br> (4, 4) - | | 1 | F | -100 | F | 2 | T | 100 | T | 2 | F | -100 | F | F | - |

*FIG. 20B*

| Valid data elements | Data elements in cluster range=1 | KF hit lists | AND KF1 (cluster count=1; hit weight value=100) | | | | AND KF2 (cluster count=1; hit weight value=100) | | | | AND NOT KF3 (cluster count=0; hit weight value=100) | | | | CF1 | |
|---|---|---|---|---|---|---|---|---|---|---|---|---|---|---|---|---|
| | | | Total hit count (for cluster) | Hit count > cluster count? | Member hit weight value | Member hit weight value > 0? | Total hit count (for cluster) | Hit count > cluster count? | Member hit weight value | Member hit weight value > 0? | Total hit count (for cluster) | Hit count > cluster count? | Member hit weight value | Member hit weight value > 0? | All member hit weights > 0? | Hit count |
| (4, 3) | (3, 2) | KF2 | 2 | T | 100 | T | 2 | T | 100 | T | 2 | F | -100 | F | F | - |
| | | KF3 | | | | | | | | | | | | | | |
| | (4, 2) | KF1 | | | | | | | | | | | | | | |
| | (5, 2) | KF1 | | | | | | | | | | | | | | |
| | (3, 3) | KF3 | | | | | | | | | | | | | | |
| | (4, 3) | KF2 | | | | | | | | | | | | | | |
| | (5, 3) | - | | | | | | | | | | | | | | |
| | (3, 4) | - | | | | | | | | | | | | | | |
| | (4, 4) | - | | | | | | | | | | | | | | |
| | (5, 4) | - | | | | | | | | | | | | | | |
| (1, 4) | (1, 3) | KF1 | 3 | T | 100 | T | 2 | T | 100 | T | 0 | T | 100 | T | T | 1 |
| | (2, 3) | - | | | | | | | | | | | | | | |
| | (1, 4) | KF1 | | | | | | | | | | | | | | |
| | (2, 4) | - | | | | | | | | | | | | | | |
| | (1, 5) | KF2 | | | | | | | | | | | | | | |
| | (2, 5) | KF1 KF2 | | | | | | | | | | | | | | |
| (1, 5) | (1, 4) | KF1 | 2 | T | 100 | T | 2 | T | 100 | T | 0 | T | 100 | T | T | 1 |
| | (2, 4) | - | | | | | | | | | | | | | | |
| | (1, 5) | KF2 | | | | | | | | | | | | | | |
| | (2, 5) | KF1 KF2 | | | | | | | | | | | | | | |
| (2, 5) | (1, 4) | KF1 | 2 | T | 100 | T | 2 | T | 100 | T | 0 | T | 100 | T | T | 1 |
| | (2, 4) | - | | | | | | | | | | | | | | |
| | (3, 4) | - | | | | | | | | | | | | | | |
| | (1, 5) | KF2 | | | | | | | | | | | | | | |
| | (2, 5) | KF1 KF2 | | | | | | | | | | | | | | |
| | (3, 5) | - | | | | | | | | | | | | | | |

*FIG. 20C*

|   | 1 | 2 | 3 | 4 | 5 |
|---|---|---|---|---|---|
| 1 |   |   |   |   |   |
| 2 |   |   |   |   | CF1 |
| 3 |   |   |   |   |   |
| 4 | CF1 |   |   |   |   |
| 5 | CF1 | CF1 |   |   |   |

*FIG. 21*

| Valid data elements | Data elements in cluster range = 2 | KF Hit Lists (by data element) | OR KF4 (cluster count = 0; hit wt value = 100) | | | | OR KF5 (cluster count = 0; hit wt value = 50) | | | | OR KF6 (cluster count = 1; hit wt value = 50) | | | | OR CF1 (cluster count = 0; hit weight value = 100) | | | | | CF2 | |
|---|---|---|---|---|---|---|---|---|---|---|---|---|---|---|---|---|---|---|---|---|---|
| | | | Total hit count (for cluster) | Hit count > cluster count? | Member hit weight value | Member hit weight > 0? | Total hit count (for cluster) | Hit count > cluster count? | Member hit weight value | Member hit weight > 0? | Total hit count (for cluster) | Hit count > cluster count? | Member hit weight value | Member hit weight > 0? | Hit lists (by data element) | Total hit count | Hit count >= cluster count? | Member hit weight value | Member hit weight > 0? | Total member hit weight > hit weight threshold of 100? | Hit count |
| (1, 1) | (1, 1) KF4, KF6 | | 1 | T | 100 | T | 1 | T | 50 | T | 2 | T | 50 | T | - | | | | | T | 1 |
| | (2, 1) - | | | | | | | | | | | | | | - | | | | | | |
| | (3, 1) - | | | | | | | | | | | | | | - | | | | | | |
| | (1, 2) - | | | | | | | | | | | | | | - | | | | | | |
| | (2, 2) - | | | | | | | | | | | | | | - | | | | | | |
| | (3, 2) KF6 | | | | | | | | | | | | | | - | | | | | | |
| | (1, 3) - | | | | | | | | | | | | | | - | | | | | | |
| | (2, 3) KF5 | | | | | | | | | | | | | | - | | | | | | |
| | (3, 3) - | | | | | | | | | | | | | | - | | | | | | |
| (4, 1) | (2, 1) - | | - | - | - | - | 2 | T | 50 | T | 1 | F | -100 | F | - CF1 - - - - - - - - - - | 1 | T | 100 | T | T | 1 |
| | (3, 1) - | | | | | | | | | | | | | | | | | | | | |
| | (4, 1) KF5 | | | | | | | | | | | | | | | | | | | | |
| | (5, 1) - | | | | | | | | | | | | | | | | | | | | |
| | (2, 2) - | | | | | | | | | | | | | | | | | | | | |
| | (3, 2) KF6 | | | | | | | | | | | | | | | | | | | | |
| | (4, 2) - | | | | | | | | | | | | | | | | | | | | |
| | (5, 2) - | | | | | | | | | | | | | | | | | | | | |
| | (2, 3) KF5 | | | | | | | | | | | | | | | | | | | | |
| | (3, 3) - | | | | | | | | | | | | | | | | | | | | |
| | (4, 3) - | | | | | | | | | | | | | | | | | | | | |
| | (5, 3) - | | | | | | | | | | | | | | | | | | | | |

FIG. 22A

| Valid data elements | Data elements in cluster range = 2 | KF Hit Lists (by data element) | OR KF4 (cluster count = 0; hit wt value = 100) | | | | OR KF5 (cluster count = 0; hit wt value = 50) | | | | OR KF6 (cluster count = 1; hit wt value = 50) | | | | OR CF1 (cluster count = 0; hit weight value = 100) | | | | | CF2 | |
|---|---|---|---|---|---|---|---|---|---|---|---|---|---|---|---|---|---|---|---|---|---|
| | | | Total hit count (for cluster) | Hit count > cluster count? | Member hit weight value | Member hit weight > 0? | Total hit count (for cluster) | Hit count > cluster count? | Member hit weight value | Member hit weight > 0? | Total hit count (for cluster) | Hit count > cluster count? | Member hit weight value | Member hit weight > 0? | Hit lists (by data element) | Total hit count | Hit count >= cluster count? | Member hit weight value | Member hit weight > 0? | Total member hit weight > hit weight threshold of 100? | Hit count |
| (3, 2) | (1, 1) | KF4 | | | | | | | | | | | | | - | | | | | | |
| | | KF6 | | | | | | | | | | | | | | | | | | | |
| | (2, 1) | - | | | | | | | | | | | | | - | | | | | | |
| | (3, 1) | - | | | | | | | | | | | | | - | | | | | | |
| | (4, 1) | KF5 | | | | | | | | | | | | | - | | | | | | |
| | (5, 1) | - | | | | | | | | | | | | | - | | | | | | |
| | (1, 2) | - | | | | | | | | | | | | | - | | | | | | |
| | (2, 2) | - | | | | | | | | | | | | | - | | | | | | |
| | (3, 2) | KF6 | | | | | | | | | | | | | - | | | | | | |
| | (4, 2) | - | | | | | | | | | | | | | - | | | | | | |
| | (5, 2) | - | 1 | T | 100 | T | 2 | T | 50 | T | 4 | T | 50 | T | CF1 | 2 | T | 100 | T | T | 1 |
| | (1, 3) | - | | | | | | | | | | | | | - | | | | | | |
| | (2, 3) | KF5 | | | | | | | | | | | | | - | | | | | | |
| | (3, 3) | - | | | | | | | | | | | | | - | | | | | | |
| | (4, 3) | - | | | | | | | | | | | | | - | | | | | | |
| | (5, 3) | - | | | | | | | | | | | | | CF1 | | | | | | |
| | (1, 4) | - | | | | | | | | | | | | | - | | | | | | |
| | (2, 4) | - | | | | | | | | | | | | | - | | | | | | |
| | (3, 4) | KF6 | | | | | | | | | | | | | - | | | | | | |
| | (4, 4) | KF6 | | | | | | | | | | | | | - | | | | | | |
| | (5, 4) | - | | | | | | | | | | | | | - | | | | | | |
| (5, 2) | (3, 1) | - | | | | | | | | | | | | | - | | | | | | |
| | (4, 1) | KF5 | | | | | | | | | | | | | - | | | | | | |
| | (5, 1) | - | | | | | | | | | | | | | - | | | | | | |
| | (3, 2) | KF6 | | | | | | | | | | | | | - | | | | | | |
| | (4, 2) | - | | | | | | | | | | | | | - | | | | | | |
| | (5, 2) | - | - | - | - | - | 1 | T | 50 | T | 3 | T | 50 | T | CF1 | 1 | T | 100 | T | T | 1 |
| | (3, 3) | - | | | | | | | | | | | | | - | | | | | | |
| | (4, 3) | - | | | | | | | | | | | | | - | | | | | | |
| | (5, 3) | - | | | | | | | | | | | | | - | | | | | | |
| | (3, 4) | KF6 | | | | | | | | | | | | | - | | | | | | |
| | (4, 4) | KF6 | | | | | | | | | | | | | - | | | | | | |
| | (5, 4) | - | | | | | | | | | | | | | - | | | | | | |

FIG. 22B

| Valid data elements | Data elements in cluster range = 2 | KF Hit Lists (by data element) | OR KF4 (cluster count = 0; hit wt value = 100) | | | | OR KF5 (cluster count = 0; hit wt value = 50) | | | | OR KF6 (cluster count = 1; hit wt value = 50) | | | | OR CF1 (cluster count = 0; hit weight value = 100) | | | | | CF2 | |
|---|---|---|---|---|---|---|---|---|---|---|---|---|---|---|---|---|---|---|---|---|---|
| | | | Total hit count (for cluster) | Hit count > cluster count? | Member hit weight value | Member hit weight > 0? | Total hit count (for cluster) | Hit count > cluster count? | Member hit weight value | Member hit weight > 0? | Total hit count (for cluster) | Hit count > cluster count? | Member hit weight value | Member hit weight > 0? | Hit lists (by data element) | Total hit count | Hit count >= cluster count? | Member hit weight value | Member hit weight > 0? | Total member hit weight > hit weight threshold of 100? | Hit count |
| | (1,1) | KF4 | | | | | | | | | | | | | - | | | | | | |
| | | KF6 | | | | | | | | | | | | | - | | | | | | |
| | (2,1) | - | | | | | | | | | | | | | - | | | | | | |
| | (3,1) | - | | | | | | | | | | | | | - | | | | | | |
| | (4,1) | KF5 | | | | | | | | | | | | | - | | | | | | |
| | (1,2) | - | | | | | | | | | | | | | - | | | | | | |
| | (2,2) | - | | | | | | | | | | | | | - | | | | | | |
| | (3,2) | KF6 | | | | | | | | | | | | | - | | | | | | |
| | (4,2) | - | | | | | | | | | | | | | - | | | | | | |
| | (1,3) | - | | | | | | | | | | | | | - | | | | | | |
| (2,3) | (2,3) | KF5 | 1 | T | 100 | T | 2 | T | 50 | T | 4 | T | 50 | T | - | 3 | T | 100 | T | T | 1 |
| | (3,3) | - | | | | | | | | | | | | | - | | | | | | |
| | (4,3) | - | | | | | | | | | | | | | - | | | | | | |
| | (1,4) | - | | | | | | | | | | | | | CF1 | | | | | | |
| | (2,4) | - | | | | | | | | | | | | | - | | | | | | |
| | (3,4) | KF6 | | | | | | | | | | | | | - | | | | | | |
| | (4,4) | KF6 | | | | | | | | | | | | | - | | | | | | |
| | (1,5) | - | | | | | | | | | | | | | CF1 | | | | | | |
| | (2,5) | - | | | | | | | | | | | | | CF1 | | | | | | |
| | (3,5) | - | | | | | | | | | | | | | - | | | | | | |
| | (4,5) | - | | | | | | | | | | | | | - | | | | | | |
| | (1,2) | - | | | | | | | | | | | | | - | | | | | | |
| | (2,2) | - | | | | | | | | | | | | | - | | | | | | |
| | (3,2) | KF6 | | | | | | | | | | | | | - | | | | | | |
| | (1,3) | - | | | | | | | | | | | | | - | | | | | | |
| | (2,3) | KF5 | | | | | | | | | | | | | - | | | | | | |
| (1,4) | (3,3) | - | - | - | - | - | 1 | T | 50 | T | 2 | T | 50 | T | - | 3 | T | 100 | T | T | 1 |
| | (1,4) | - | | | | | | | | | | | | | CF1 | | | | | | |
| | (2,4) | - | | | | | | | | | | | | | - | | | | | | |
| | (3,4) | KF6 | | | | | | | | | | | | | - | | | | | | |
| | (1,5) | - | | | | | | | | | | | | | CF1 | | | | | | |
| | (2,5) | - | | | | | | | | | | | | | CF1 | | | | | | |
| | (3,5) | - | | | | | | | | | | | | | - | | | | | | |

| Valid data elements | Data elements in cluster range = 2 | KF Hit Lists (by data element) | OR KF4 (cluster count = 0; hit wt value = 100) Total hit count (for cluster) | Hit count > cluster count? | Member hit weight value | Member hit weight > 0? | OR KF5 (cluster count = 0; hit wt value = 50) Total hit count (for cluster) | Hit count > cluster count? | Member hit weight value | Member hit weight > 0? | OR KF6 (cluster count = 1; hit wt value = 50) Total hit count (for cluster) | Hit count > cluster count? | Member hit weight value | Member hit weight > 0? | Hit lists (by data element) | OR CF1 (cluster count = 0; hit weight value = 100) Total hit count | Hit count >= cluster count? | Member hit weight value | Member hit weight > 0? | CF2 Total member hit weight > hit weight threshold of 100? | Hit count |
|---|---|---|---|---|---|---|---|---|---|---|---|---|---|---|---|---|---|---|---|---|---|
| (1,5) | (1,3) | - | | | | | | | | | | | | | - | | | | | | |
| | (2,3) | KF5 | | | | | | | | | | | | | - | | | | | | |
| | (3,3) | - | | | | | | | | | | | | | - | | | | | | |
| | (1,4) | - | | | | | | | | | | | | | CF1 | | | | | | |
| | (2,4) | - | - | - | - | - | 1 | T | 50 | T | 1 | F | -100 | F | - | 3 | T | 100 | T | T | 1 |
| | (3,4) | KF6 | | | | | | | | | | | | | - | | | | | | |
| | (1,5) | - | | | | | | | | | | | | | CF1 | | | | | | |
| | (2,5) | - | | | | | | | | | | | | | CF1 | | | | | | |
| | (3,5) | - | | | | | | | | | | | | | - | | | | | | |
| (2,5) | (1,3) | - | | | | | | | | | | | | | - | | | | | | |
| | (2,3) | KF5 | | | | | | | | | | | | | - | | | | | | |
| | (3,3) | - | | | | | | | | | | | | | - | | | | | | |
| | (4,3) | - | | | | | | | | | | | | | - | | | | | | |
| | (1,4) | - | | | | | | | | | | | | | CF1 | | | | | | |
| | (2,4) | - | - | - | - | - | 1 | T | 50 | T | 2 | T | 50 | T | - | 3 | T | 100 | T | T | 1 |
| | (3,4) | KF6 | | | | | | | | | | | | | - | | | | | | |
| | (4,4) | KF6 | | | | | | | | | | | | | - | | | | | | |
| | (1,5) | - | | | | | | | | | | | | | CF1 | | | | | | |
| | (2,5) | - | | | | | | | | | | | | | CF1 | | | | | | |
| | (3,5) | - | | | | | | | | | | | | | - | | | | | | |
| | (4,5) | - | | | | | | | | | | | | | - | | | | | | |
| (5,5) | (3,3) | - | | | | | | | | | | | | | - | | | | | | |
| | (4,3) | - | | | | | | | | | | | | | - | | | | | | |
| | (5,3) | - | | | | | | | | | | | | | - | | | | | | |
| | (3,4) | KF6 | | | | | | | | | | | | | - | | | | | | |
| | (4,4) | KF6 | - | - | - | - | - | - | - | - | 3 | T | 50 | T | - | - | - | - | - | F | - |
| | (5,4) | - | | | | | | | | | | | | | - | | | | | | |
| | (3,5) | - | | | | | | | | | | | | | - | | | | | | |
| | (4,5) | - | | | | | | | | | | | | | - | | | | | | |
| | (5,5) | KF6 | | | | | | | | | | | | | - | | | | | | |

FIG. 22E

|   | 1 | 2 | 3 | 4 | 5 |
|---|---|---|---|---|---|
| 1 | CF2 |  |  | CF2 |  |
| 2 |  |  | CF2 |  | CF1 CF2 |
| 3 |  | CF2 |  |  |  |
| 4 | CF1 CF2 |  | CF2 | CF2 |  |
| 5 | CF1 CF2 | CF1 CF2 |  |  |  |

*FIG. 23*

| Valid data elements | Data elements in cluster range = 1 | XOR KF3 (cluster count = 0; hit weight value = 100) | | | | | CF3 | | | XOR CF2 (cluster count = 1; hit weight value = 100) | | | | | CF3 | | |
|---|---|---|---|---|---|---|---|---|---|---|---|---|---|---|---|---|---|
| | | Hit Lists (by data element) | Total hit count (for cluster) | Hit count >= cluster count? | Member hit weight value | Member hit weight > 0? | (Initial) Total hit weight == 0? | Updated total hit weight | Hit count | Hit lists (by data element) | Total hit count (for cluster) | Hit count >= cluster count? | Member hit weight value | Member hit weight > 0? | Total hit weight == 0? | Updated total hit weight | Total hit count |
| (1, 1) | (1, 1) | - | | | | | | | | CF2 | | | | | | | |
| | (2, 1) | - | | | | | | | | - | | | | | | | |
| | (1, 2) | KF3 | 1 | T | 100 | T | T | 100 | 1 | - | 1 | F | -100 | F | - | - | 1 |
| | (2, 2) | - | | | | | | | | - | | | | | | | |
| (4, 1) | (3, 1) | - | | | | | | | | - | | | | | | | |
| | (4, 1) | - | | | | | | | | CF2 | | | | | | | |
| | (5, 1) | - | | | | | | | | - | | | | | | | |
| | (3, 2) | KF3 | 1 | T | 100 | T | T | 100 | 1 | CF2 | 3 | T | 100 | T | F | - | 0 |
| | (4, 2) | - | | | | | | | | - | | | | | | | |
| | (5, 2) | - | | | | | | | | CF2 | | | | | | | |
| (1, 2) | (1, 1) | - | | | | | | | | CF2 | | | | | | | |
| | (2, 1) | - | | | | | | | | - | | | | | | | |
| | (1, 2) | KF3 | 1 | T | 100 | T | T | 100 | 1 | - | 2 | T | 100 | T | F | - | 0 |
| | (2, 2) | - | | | | | | | | - | | | | | | | |
| | (1, 3) | - | | | | | | | | - | | | | | | | |
| | (2, 3) | - | | | | | | | | CF2 | | | | | | | |
| (3, 2) | (2, 1) | - | | | | | | | | - | | | | | | | |
| | (3, 1) | - | | | | | | | | - | | | | | | | |
| | (4, 1) | - | | | | | | | | CF2 | | | | | | | |
| | (2, 2) | - | | | | | | | | - | | | | | | | |
| | (3, 2) | KF3 | 2 | T | 100 | T | T | 100 | 1 | CF2 | 3 | T | 100 | T | F | - | 0 |
| | (4, 2) | - | | | | | | | | - | | | | | | | |
| | (2, 3) | - | | | | | | | | CF2 | | | | | | | |
| | (3, 3) | KF3 | | | | | | | | - | | | | | | | |
| | (4, 3) | - | | | | | | | | - | | | | | | | |
| (5, 2) | (4, 1) | - | | | | | | | | CF2 | | | | | | | |
| | (5, 1) | - | | | | | | | | - | | | | | | | |
| | (4, 2) | - | | | | | | | | - | | | | | | | |
| | (5, 2) | - | - | - | - | F | - | - | - | CF2 | 2 | T | 100 | T | T | 100 | 1 |
| | (4, 3) | - | | | | | | | | - | | | | | | | |
| | (5, 3) | - | | | | | | | | - | | | | | | | |

FIG. 24A

| Valid data elements | Data elements in cluster range = 1 | Hit Lists (by data element) | XOR KF3 (cluster count = 0; hit weight value = 100) | | | | CF3 | | XOR CF2 (cluster count = 1; hit weight value = 100) | | | | CF3 | | |
|---|---|---|---|---|---|---|---|---|---|---|---|---|---|---|---|
| | | | Total hit count (for cluster) | Hit count >= cluster count? | Member hit weight value | Member hit weight > 0? | (Initial) Total hit weight == 0? | Updated total hit weight / Hit count | Hit lists (by data element) | Total hit count (for cluster) | Hit count >= cluster count? | Member hit weight value | Member hit weight > 0? | Total hit weight == 0? | Updated total hit weight / Total hit count |
| (2, 3) | (1, 2) | KF3 | | | | | | | - | | | | | | |
| | (2, 2) | - | | | | | | | - | | | | | | |
| | (3, 2) | KF3 | | | | | | | CF2 | | | | | | |
| | (1, 3) | - | | | | | | | - | | | | | | |
| | (2, 3) | - | 3 | T | 100 | T | T | 100 1 | CF2 | 4 | T | 100 | T | F | - 0 |
| | (3, 3) | KF3 | | | | | | | - | | | | | | |
| | (1, 4) | - | | | | | | | CF2 | | | | | | |
| | (2, 4) | - | | | | | | | - | | | | | | |
| | (3, 4) | - | | | | | | | CF2 | | | | | | |
| (3, 3) | (2, 2) | - | | | | | | | - | | | | | | |
| | (3, 2) | KF3 | | | | | | | CF2 | | | | | | |
| | (4, 2) | - | | | | | | | - | | | | | | |
| | (2, 3) | - | | | | | | | CF2 | | | | | | |
| | (3, 3) | KF3 | 2 | T | 100 | T | T | 100 1 | - | 4 | T | 100 | T | F | - 0 |
| | (4, 3) | - | | | | | | | - | | | | | | |
| | (2, 4) | - | | | | | | | - | | | | | | |
| | (3, 4) | - | | | | | | | CF2 | | | | | | |
| | (4, 4) | - | | | | | | | CF2 | | | | | | |
| (1, 4) | (1, 3) | - | | | | | | | - | | | | | | |
| | (2, 3) | - | | | | | | | CF2 | | | | | | |
| | (1, 4) | - | - | - | - | F | - | - - | CF2 | 4 | T | 100 | T | T | 100 1 |
| | (2, 4) | - | | | | | | | - | | | | | | |
| | (1, 5) | - | | | | | | | CF2 | | | | | | |
| | (2, 5) | - | | | | | | | CF2 | | | | | | |
| (3, 4) | (2, 3) | - | | | | | | | CF2 | | | | | | |
| | (3, 3) | KF3 | | | | | | | - | | | | | | |
| | (4, 3) | - | | | | | | | - | | | | | | |
| | (2, 4) | - | | | | | | | - | | | | | | |
| | (3, 4) | - | 1 | T | 100 | T | T | 100 1 | CF2 | 4 | T | 100 | T | F | - 0 |
| | (4, 4) | - | | | | | | | CF2 | | | | | | |
| | (2, 5) | - | | | | | | | CF2 | | | | | | |
| | (3, 5) | - | | | | | | | - | | | | | | |
| | (4, 5) | - | | | | | | | - | | | | | | |

FIG. 24B

| Valid data elements | Data elements in cluster range = 1 | XOR KF3 (cluster count = 0; hit weight value = 100) | | | | | CF3 | | | XOR CF2 (cluster count = 1; hit weight value = 100) | | | | | CF3 | | |
|---|---|---|---|---|---|---|---|---|---|---|---|---|---|---|---|---|---|
| | | Hit Lists (by data element) | Total hit count (for cluster) | Hit count >= cluster count? | Member hit weight value | Member hit weight > 0? | (Initial) Total hit weight == 0? | Updated total hit weight | Hit count | Hit lists (by data element) | Total hit count (for cluster) | Hit count >= cluster count? | Member hit weight value | Member hit weight > 0? | Total hit weight == 0? | Updated total hit weight | Total hit count |
| (4, 4) | (3, 3) | KF3 | | | | | | | | - | | | | | | | |
| | (4, 3) | - | | | | | | | | - | | | | | | | |
| | (5, 3) | - | | | | | | | | - | | | | | | | |
| | (3, 4) | - | | | | | | | | CF2 | | | | | | | |
| | (4, 4) | - | 1 | T | 100 | T | T | 100 | 1 | CF2 | 2 | T | 100 | T | F | - | 0 |
| | (5, 4) | - | | | | | | | | - | | | | | | | |
| | (3, 5) | - | | | | | | | | - | | | | | | | |
| | (4, 5) | - | | | | | | | | - | | | | | | | |
| | (5, 5) | - | | | | | | | | - | | | | | | | |
| (1, 5) | (1, 4) | - | | | | | | | | CF2 | | | | | | | |
| | (2, 4) | - | | | | | | | | - | | | | | | | |
| | (1, 5) | - | - | - | - | F | - | - | - | CF2 | 3 | T | 100 | T | T | 100 | 1 |
| | (2, 5) | - | | | | | | | | CF2 | | | | | | | |
| (2, 5) | (1, 4) | - | | | | | | | | CF2 | | | | | | | |
| | (2, 4) | - | | | | | | | | - | | | | | | | |
| | (3, 4) | - | | | | | | | | CF2 | | | | | | | |
| | (1, 5) | - | - | - | - | F | - | - | - | CF2 | 4 | T | 100 | T | T | 100 | 1 |
| | (2, 5) | - | | | | | | | | CF2 | | | | | | | |
| | (3, 5) | - | | | | | | | | - | | | | | | | |

FIG. 24C

|   | 1 | 2 | 3 | 4 | 5 |
|---|---|---|---|---|---|
| 1 | CF3 |  |  |  |  |
| 2 |  |  |  |  | CF3 |
| 3 |  |  |  |  |  |
| 4 | CF3 |  |  |  |  |
| 5 | CF3 | CF3 |  |  |  |

*FIG. 25*

METHODS AND SYSTEMS FOR COMPOUND FEATURE CREATION, PROCESSING, AND IDENTIFICATION IN CONJUNCTION WITH A DATA ANALYSIS AND FEATURE RECOGNITION SYSTEM WHEREIN HIT WEIGHTS ARE SUMMED

PRIORITY CLAIM

This application claims the benefit of U.S. Provisional Application Ser. No. 61/037,266 filed Mar. 17, 2008, contents of which are incorporated herein.

FIELD OF THE INVENTION

The present invention, in various embodiments, relates generally to the fields of data analysis and feature recognition and more particularly to recognizing, relating, and discriminating more complex features within a data set or selection therein.

BACKGROUND OF THE INVENTION

Within the realm of automated data analysis and feature recognition systems, such as disclosed by Brinson, et al., in U.S. patent application 2007/0244844, which is incorporated by reference in its entirety herein, or any user-specified, preset, or automatically determined application or engine intended for use in the same or a similar manner, data discrimination is a "make or break" scenario insomuch as its accuracy and reliability are as much a product of the quality and legitimacy of the data being processed as they are the user's ability to effectively differentiate minute variances in the data and train the data correctly. Not only might information be lost in the translation of digital data from its raw form into a convenient, human perceivable output format, but once the data is converted, the burden then falls upon the user to make oft times indiscernible distinctions and selections in the ambiguous data. This can result in errors in training that have the potential to cause data and feature misidentification, such as inter alia false-positive or false-negative results, algorithm confusion, and/or data confusion once these errantly identified features are used as a foundation to process real-world data sets.

The underlying problem within most data analysis and feature recognition systems is the need to discriminate, conglomerate, and/or associate features, which can exist in a potentially multivalent, large pool of data, in accordance with relative human perception, interpretation, and visualization of the data. A feature, as recognized by the system, is simply an association of specific, finite data values and patterns that are characteristic of an entity deemed existent by a user. While specific data characteristics can be trained into the system as representative of the feature, the feature itself is merely a concrete representation of an abstract human interpretation, which is certainly fallible due to the occurrence of human biases, the ability to accurately achieve and interpret alternate renderings, etc.

While the data analysis and feature recognition industry has made strides in mitigating the occurrences of feature misidentification through the use of specialized and/or alternative visualization and feature recognition options, which can be used to extenuate the incidences of false-positives, the fact remains that most systems lack the fundamental capability to relate human perception and discernment of features in a way most amicable to proper sagaciousness of features present within a given data set or selection therein. Many current systems typically fail to reconcile bad or erroneous data; to provide for redundancy or the evaluation of compound or more complex features (e.g., the evaluation of this feature AND that feature together, this feature OR that feature together, this feature AND NOT that feature together); to specify data sensitivity (so as to delineate or mitigate erroneous or deviated results); to conglomerate features into more complex features (e.g., positive identification of the feature "cancer" requires certain criteria to be fulfilled); and/or to allow data modality and submodality independence and cooperation (for evaluation of data of different types, sources, modalities, submodalities, etc.). As such, the data discrimination capabilities currently prevalent in modern data analysis and feature recognition systems do not afford users the leniency needed when attempting to make discriminations in potentially enigmatic data. Subsequently, data training and processing using these faultily identified features is inaccurate at best or entirely useless.

SUMMARY OF THE INVENTION

The methods and systems for creation, processing, and use of compound features during data analysis and feature recognition are disclosed herein. In a preferred embodiment, the present invention functions to apply a new level of data discrimination during data analysis and feature recognition events such that features are more easily discerned from the remainder of the data pool using processing techniques that are more conducive to human visualizations, perceptions, and/or interpretations of data. This is accomplished using an example tool that allows previously processed and identified features (hereafter "known features") to be aggregated so as to aid the system in recognizing abstract human perceptions as concrete data features.

For example in the imagery embodiment, the concept of "shoreline" is an innately human interpretation of the geographical area where a body of water meets land. However, there is no distinct, tangible feature identified simply as "shoreline" because, by definition, "shoreline" is the conceptualized coexistence of the known features "Land" and "Water" at a given metaphysical location or within some user-specified proximity to one another. The methods and systems of the present invention allow the two known features "Land" and "Water" to be amalgamated into the single compound feature "Shoreline." This capability to assemble multiple, individual known features and/or other compound features (hereafter "sub-compound features"), when available, into a single, distinct, and comprehensive entity, which is ultimately resolvable down to logical combinations and quantities of known features, allows for a more realistic evaluation of the data because it is founded upon human conceptualization of the feature as it exists in the original data set.

The methods and systems of the present invention as described herein provide the ability to conglomerate previously processed and identified features in data or selections therein without requiring adaptation of the processing mechanism to a particular application, environment, or data content. The methods and systems such as described herein allow for data-modality-independent association and processing of previously recognized features in any digital data using a common data analysis and feature recognition system, such as described by Brinson, et al, in U.S. patent applications 2007/0244844 and 2007/0195680, both of which are incorporated by reference in their entirety herein, or any acceptable user-specified, preset, or automatically determined application or engine intended for use in the same or a similar manner. Example data modalities include, inter alia, imagery, acoustics, olfaction, tactile/haptic, and as-yet-undiscovered modalities. Moreover, the data modality represented by the subject data set or selection therein can be a combination of different modalities as well. As such, features of varying data types, sources, modalities, submodalities, etc., can be evaluated and/or conglomerated together to afford an opportunity for more complex data discrimination and evaluation.

BRIEF DESCRIPTION OF THE DRAWINGS

Preferred and alternative examples of the present invention are described in detail below with reference to the following drawings:

FIG. 17 shows an example data array representing one embodiment of a known feature data output overlay;

FIG. 18 shows an example data table of the compound features that are scheduled for processing;

FIG. 19 shows an example data table of the compound feature queue;

FIGS. 20A-20C show an example data table of the results of compound feature queue processing wave 3;

FIG. 21 shows an example data array representing one embodiment of the temporary compound feature data output overlay as it exists after the completion of compound feature queue processing wave 3;

Figure 22D:
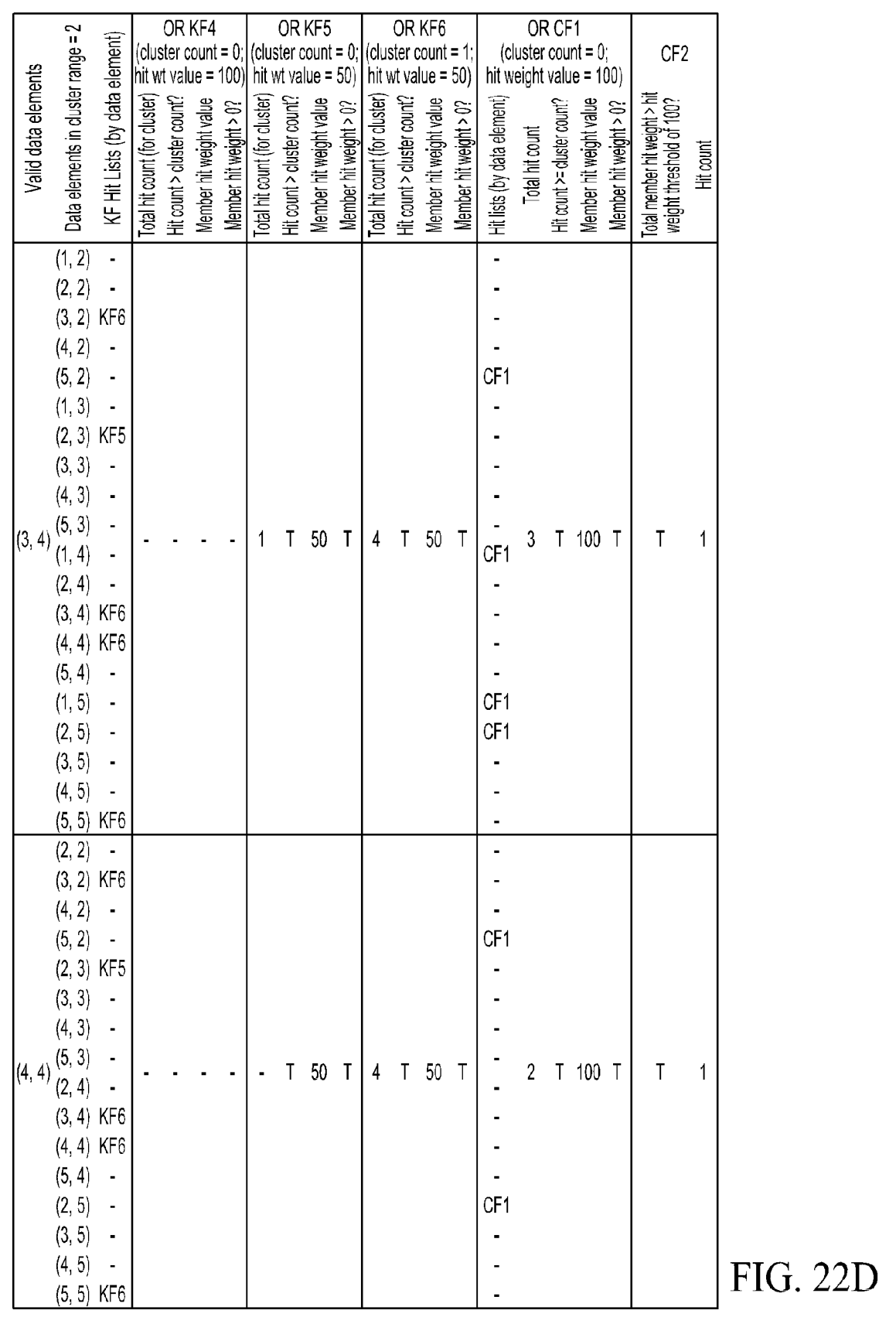

FIGS. 22A-22E show an example data table of the results of compound feature queue processing wave 2;

FIG. 23 shows an example data array representing one embodiment of the temporary compound feature data output overlay as it exists after the completion of compound feature queue processing waves 3 and 2;

FIGS. 24A-24C show an example data table of the results of compound feature queue processing wave 1;

FIG. 25 shows an example data array representing one embodiment of the main compound feature data output overlay as it exists after the completion of compound feature queue processing waves 3, 2, and 1;

DETAILED DESCRIPTION OF THE PREFERRED EMBODIMENT

Figure 1:
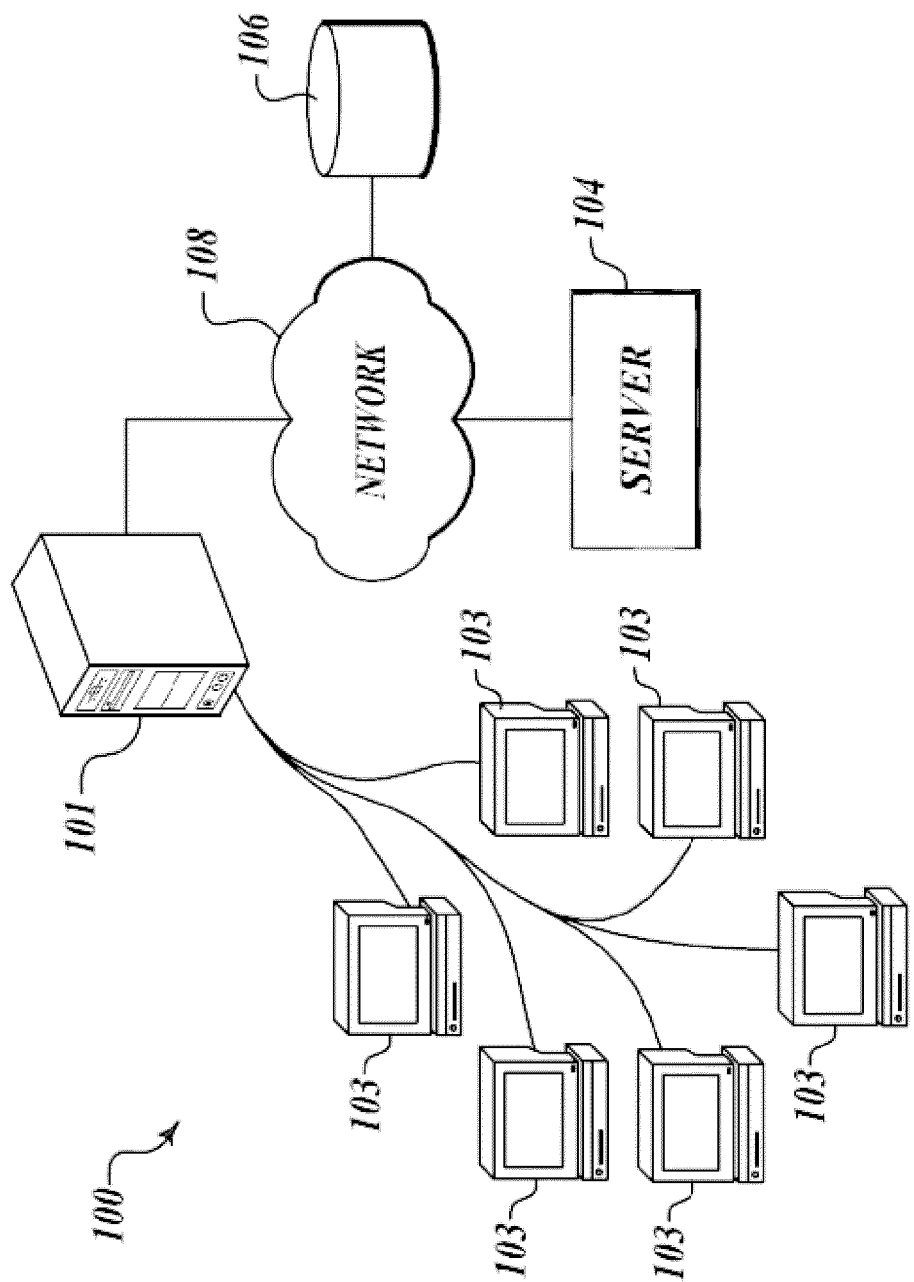
FIG. 1 shows one embodiment of an example data analysis and feature recognition system that is employed for creation, processing, and use of compound features.

The methods and systems for compound known feature (hereafter "compound feature") conception, processing, identification, and use, such as disclosed herein, improve upon a common data analysis and feature recognition system, such as described by Brinson, et al., in U.S. patent application 2007/0244844 or any acceptable user-specified, preset, or automatically determined application or engine intended for use in the same or a similar manner, by providing a means by which to achieve more complete data elucidation than is currently permitted using known features alone. By using compound features during data analysis and feature recognition exercises, the data values and patterns characteristic of a given data set or selection therein are more effectively evaluated in association with human visual perception and feature discernment. For example, the known feature processing foundation layers, which in some embodiments are based upon training and/or recognition of known features, are investigated to an unspecified level using compound features, which can be comprised of one or pluralities of previously identified known features and/or other nested or sub-compound features and can incorporate additional decision factors (e.g., logical base operation, feature clustering criteria, and/or member hit weighting) in order to permit more thorough and accurate data discrimination and feature identification.

Accordingly, these methods and systems for compound feature creation, processing, and use presuppose prior execution and completion of known feature training, processing, detection, and/or recognition. For clarity, these processes are described succinctly forthwith. However, this description is not intended to limit, in any way, the methodologies used to identify, train, and process one or pluralities of known features.

Any acceptable user-specified, preset, or automatic data analysis and feature recognition system is configured to accept one or pluralities of original source data sets or selections therein containing one or pluralities of known and pre-identified features (e.g., a known pattern, shape, object, or entity). In one embodiment, the system is generally configured such that the user can "train" the system to recognize a known feature via the execution of one or pluralities of evaluation algorithms in association with a particular sampling area of data (i.e., any collection of data elements surrounding or associated with one or pluralities of centralized data elements) (hereafter "target data area"). These algorithms and the target data area (hereafter "TDA") are used in concert to assess the representative data of a given data set selection in order to identify the unique sets of data values and patterns characterizing the feature. Once training of all known features is complete, a new data set selection, which can contain an unknown set of features, is presented to the system for subsequent analysis. The same pluralities of evaluation algorithms and the same TDA, as were used during preliminary known feature training, are called to evaluate the new data set selection. The resultant algorithmically determined data values and patterns are subsequently compared to the previously identified and stored data values and patterns in order to positively identify any previously trained known features contained therein. The results of this known feature processing exercise are then stored in a data storage structure, such as a data output overlay or any acceptable user-specified, preset, or automatically determined storage device (e.g., a data array, database, algorithm data store, value cache, datastore) (hereafter "known feature data output overlay"), which is sized and addressed in the same manner as the data set selection that is currently being processed and is capable of at least temporarily storing data, for retrieval at a future time if those particular known features are called as members of subsequent compound features.

When the data analysis and feature recognition system is tasked with the evaluation of even more complex data relationships and accomplishment of more difficult data discriminations, the result is what is disclosed herein as compound feature creation, processing, and identification. Delineation of a compound feature(s) allows one or pluralities of known features and/or other sub-compound features, when available, to be married into a single, discrete unit for evaluation. When a compound feature is processed, the system analyzes whether or not the combined requirements (e.g., cluster range, logical base operation, and/or known feature processing options) embodied by the given compound feature are satisfied, with regard to the compound feature's aggregate members (hereafter "compound feature members"), for the subject data element within the current data set or selection therein. Once the incremental processing of each compound feature is complete, the results are stored in another data storage structure, such as a data output overlay or any user-specified, preset, or automatically determined storage device (e.g., a data array, database, datastore, value cache, datastore) (hereafter "compound feature data output overlay"), which is sized and addressed in the same manner as the data set selection that is currently being processed and is capable of at least temporarily storing data. This process is akin to a mechanism that reports which features "hit" or "miss" for a given data element location. Upon identification of a given compound feature within a data set or selection therein, the system notifies the user of such and/or presents a visual representation (e.g., a graphical image) of the results.

Although several of the data analysis and feature recognition system embodiments and examples for compound feature creation, processing, and identification as disclosed herein are described with reference to specific data types, modalities, submodalities, etc., such as image data, the present invention is not limited in scope or breadth to analysis of or applicability to these data types. The methods and systems as described herein can be used to recognize discrete features in a data set or any other collection of information that can be represented in a quantifiable datastore.

As used herein, the term "datastore" retains its traditional meaning and refers to any software or hardware element capable of at least temporarily storing data.

As used herein, the term "target data element" (TDE) refers to a discrete point of a larger data set in a given medium that is being evaluated for characteristics using evaluation algorithms and a given TDA. A TDE can be any size appropriate for a particular data type, modality, submodality, etc. For example, in a set of graphical data, a TDE can consist of a single pixel, a localized grouping of pixels, or any other discrete grouping of pixels. In several embodiments and regardless of size, a TDE is a "point" that is evaluated in a single discrete step before processing moves to the next TDE in a data set or selection therein.

As used herein, the term "target data area" (TDA) refers to an ordered collection of data elements immediately surrounding a TDE. The size and shape of a TDA vary depending upon the type of data or medium that is evaluated, user specifications, and/or industry- or system-acceptable standards and can define the member data elements available for inclusion during evaluation of a given TDE.

As used herein, the term "known feature" (KF) refers to an element of data representing an entity, item, object, pattern, or other discretely definable piece of information known to be present in a particular data set during training. At the time of processing, the system searches a new data set for one or more of the previously defined known features.

As used herein, the term "compound feature" (CF) refers to the association of one or more known features and/or other nested or sub-compound features, if available, into a single, logical unit. Accordingly, the term "compound feature" can be considered as a subclass of "known feature" in that it is comprised of several known features. Compound features are useful during data analysis and feature recognition exercises when a user is seeking to uncover exceedingly complex relationships or to make more profound data value and pattern discriminations within a particular data set than known features alone allow.

As used herein, the term "sub-compound feature" refers to a regular compound feature that is used to partially define, is a member of, and/or is nested within a parent compound feature. A sub-compound feature is evaluated on its own prior to evaluation of the parent compound feature and can contain other known features and/or sub-compound features.

As used herein, the term "compound feature member" refers to any number of component known features and/or sub-compound features comprising a parent compound feature.

As used herein, the term "data output overlay" refers to a storage structure, which is sized and addressed in the same manner as the original data set or selection therein, used for storing data. At each storage location within the data output overlay is a listing of objects or features (i.e., known features in the case of a known feature data output overlay; compound features in the case of a compound feature data output overlay) identified there. In one embodiment, the data analysis and feature recognition system of the present invention utilizes three data output overlays. The known feature data output overlay is complete at the end of known feature identification. The temporary compound feature data output overlay is used by the compound feature post-processor to record the hit locations of implicitly selected compound features as each compound feature queue processing wave is complete. The main compound feature data output overlay is used by the compound feature post-processor to record the hit locations of explicitly selected compound features as each compound feature queue processing wave is complete. In an alternate embodiment, any number of data output overlays are initialized and used during processing for feature hit location storage.

As used herein, the terms "hit" and "activate" are used interchangeably and refer to the positive identification of a feature at a given data element location during feature processing.

As used herein, the term "miss" is defined as the opposite of "hit" and refers to the negative identification of a feature at a given data element location during feature processing.

As used herein, the term "explicit processing selection (of a compound feature)" refers to a user's overt decision to process a specific compound feature. Each compound feature that is explicitly selected for processing is first resolved down to its component known features before processing can proceed.

As used herein, the term "implicit processing selection (of a compound feature)" refers to the requisite processing of all sub-compound features, which exist as members of any explicitly selected compound feature, down to their component known feature members. When a user explicitly selects a particular compound feature for processing, all sub-compound features contained therein must first be resolved down to their component known features and as such are "implicitly selected" for processing.

As used herein, the term "cluster range (value)" refers to a set of data elements, surrounding a given centralized data element or TDE, over which a compound feature and/or compound feature member are evaluated. In one embodiment, the cluster range is a number representing the actual physical distance, in the sense of radius or norm in, over which the compound feature members operate, while in an alternate embodiment it represents a mathematical relationship between the members. In either embodiment, the cluster range is dictated by the topology and dimensionality of the data set or selection therein that is being processed.

As used herein, the term "logical base operator" refers to a logical operator that applies over all the associations (or members) of a compound feature. Possible compound feature base operators include AND, OR, and XOR (i.e., eXclusive OR). The AND base operator requires that all associations of the compound feature be present within the cluster range of the compound feature in order for the compound feature to activate for a given TDE. The OR operator requires at least one of the compound feature members to be present within the cluster range of the compound feature for the compound feature to activate for the given TDE. The XOR operator, which infers a "this and not that" relationship between compound feature members, requires only one of the compound feature members, and no other compound feature members, to be present within the cluster range of the compound feature in order to activate said compound feature at a given TDE.

As used herein, the term "sub-operator" refers to an additional operator that applies to a compound feature member and modifies, in some fashion, the connotation of the compound feature logical base operator. Sub-operators include hit weight (to be used only in conjunction with a compound feature associated with the logical base operator OR), cluster count, and negation.

As used herein, the term "hit weight (value)" refers to a feature association that is applicable only to compound features associated with the logical base operator OR and whose assigned value represents a percentage less than or equal to one hundred (100%). Un-weighted compound feature member associations automatically default to a value of 100% and are therefore capable of activating a compound feature alone (assuming all compound feature and compound feature restrictions, including cluster range, cluster count, and negation, are also met). In contrast, weighted compound feature member associations must accumulate a value of 100% or more to result in a positive hit for a compound feature at a given TDE (assuming all compound feature and compound feature member restrictions are also met).

As used herein, the term "cluster count (value)" refers to a compound feature member sub-operator value defining how many times (if more than once) the compound feature member's associated known feature(s) and/or sub-compound feature(s) are required to be present within the compound feature cluster range in order for a member to activate for a given data element. If the member is negated, then this value is the number of times the feature(s) must be present for the member to miss for a given data element.

As used herein, the term "(feature) negation" refers to a compound feature member with the negate sub-operator activated. This member is evaluated such that a hit for the member means a miss for the parent compound feature, and the cluster count value indicates a hit count value of "less than this many" is required for a positive hit rather than a hit count value of "at least this many" over the cluster range.

As used herein, the term "(data) modality" retains its traditional meaning and refers to one of the various forms or formats of digital data that can be processed. For example, image data represents one modality, while sound data represents another. In addition to describing data types that conform to one or more human sensory modalities, the term is also intended to encompass data types and formats that might have little or no relation to the human senses. For example, financial data, demographic data, and literary data also represent modalities within the definition of the term as used herein.

As used herein, the term "(data) submodality" refers to a sub-classification of a data modality. In some embodiments, a submodality refers to one of the applications or sources for the data that can affect how the data is processed. For example, X-ray and satellite photography are submodalities of the imaging modality. Moreover, systems that are manufactured by different vendors (e.g., GENERAL ELECTRIC, SIEMENS) but are used for producing X-ray images can vary enough in their data formats to require separation into different submodalities.

FIG. 1 shows an example system 100 for creation, processing, and identification of compound features by a data analysis and feature recognition system, such as disclosed by Brinson, et al., in U.S. patent application 2007/0244844, or as accomplished using any acceptable application or engine intended for use in the same or a similar manner. In one embodiment, the system 100 includes a single computer 101. In an alternate embodiment, the system 100 includes a computer 101 in communication with pluralities of other computers 103. In an alternate embodiment, the computer 101 is connected with pluralities of other computers 103, a server 104, a datastore 106, and/or a network 108, such as an intranet or the Internet. In yet another embodiment, a bank of servers, a wireless device, a cellular telephone, and/or another data capture/entry device(s) can be used in place of the computer 101. In one embodiment, a data storage device 106 stores a data output overlay. The data storage device 106 can be stored locally at the computer 101 or at any remote location while remaining retrievable by the computer 101. In one embodiment, an application program, which can create the datastore, is run by the server 104 or by the computer 101. Also, the computer 101 or server 104 can include an application program(s) that identifies previously trained known feature(s) and/or compound feature(s) in digital media. The media is at least one or pluralities of image pixels or at least one sound recording sample.

Figure 2:
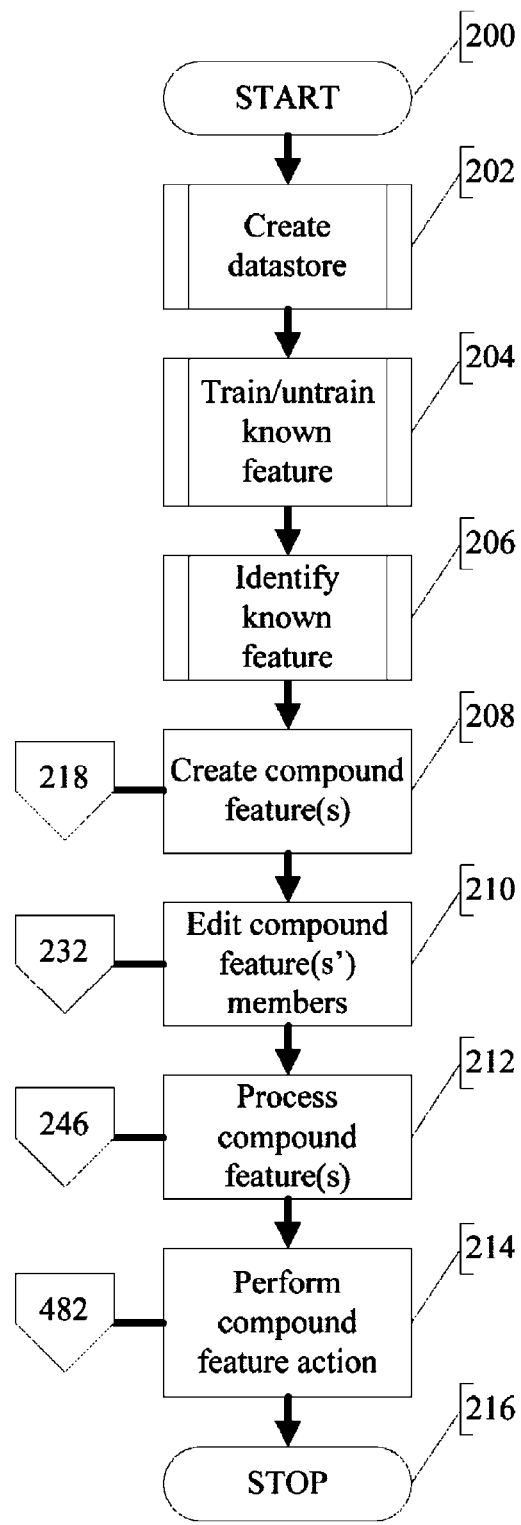
FIG. 2 shows an example method for creating and processing a compound feature using any acceptable data analysis and feature recognition system.

FIG. 2 shows a method formed in accordance with an embodiment of the present invention. The method initializes at block 200, and at block 202, a datastore is created. In one embodiment, at block 204 a known feature is trained or untrained in the datastore. At block 206, the known feature is identified. The methods of blocks 202, 204, and 206 can be accomplished using any acceptable user-specified, preset, or automatically determined data analysis and feature recognition system that results in the identification and storage of one or pluralities of known features.

At block 208 of FIG. 2, a compound feature(s) is created; this is described in more detail with reference to FIG. 3. At block 210, the compound feature members are edited; this is described in more detail with reference to FIG. 4. At block 212, the compound feature(s) is processed; this is described in more detail with reference to FIGS. 5-15. At block 214, the associated compound feature action(s) is performed; this is described in more detail with reference to FIG. 16. At block 216, the method for creation and processing of a compound feature(s) is complete.

Figure 3:
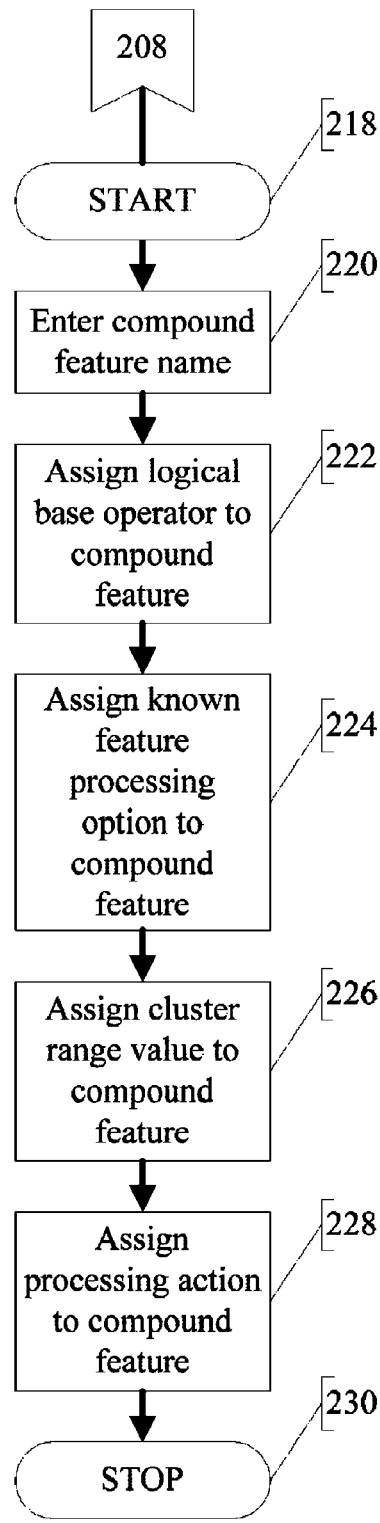
FIG. 3 shows an example method for creating a compound feature.

FIG. 3 shows an example method 208 for creating a compound feature. The method 208 initializes at block 218, and at block 220 a compound feature name is entered. At block 222, the compound feature method of operation attribute, which is defined by an associated logical base operator (i.e., AND, OR, XOR) that applies over all the members of a particular compound feature, is assigned. A compound feature affiliated with the base operator AND requires all associated members to hit (i.e., be present) within the specified compound feature cluster range value in order for the compound feature to positively activate at the given data element. The compound feature cluster range value attribute is further described at block 226. A compound feature affiliated with the base operator OR requires at least one associated member or a combination of hit-weighted compound feature members to hit within the specified compound feature cluster range value in order for the compound feature to positively activate at the given data element. The compound feature member hit weight attribute is further described with reference to block 238. A compound feature affiliated with the base operator XOR requires only one associated member, and no other member(s), to hit within the specified compound feature cluster range value in order for the compound feature to positively activate at the given data element. The presence of more than one different member within the cluster range value causes the compound feature to miss for the given data element. Note that in each of the aforementioned scenarios, determination of whether a compound feature hits for a given data element is contingent upon satisfaction of the compound feature attributes (e.g., logical base operator association, known-feature-processing option, cluster range value) as well as the associated member properties (e.g., hit weight value, cluster count value, negation sub-operator association).

At block 224 of FIG. 3, the compound feature known-feature-processing option attribute, which controls how the compound feature members, specifically the known feature members, are evaluated during compound feature processing. Since following known feature processing it is possible for multiple known features to be identified at any given data element location, compound feature known-feature-members can be processed in multiple ways. When determining whether a particular compound feature positively activates for a given data element, the system can preferably return any known feature that hits for the given data element or only the known feature trained most often for the given data element.

At block 226 of FIG. 3, the compound feature cluster range value is assigned. The cluster range value defines how far, in each applicable direction and dimension from where a compound feature member is identified that other members of the same compound feature must also be located in order for the compound feature to positively activate for a given data element. The value, which can be user-specified, preset, or automatically determined, can refer to the actual physical distance in which the compound feature members operate; alternatively, the value can simply represent some mathematical relationship between the members. Compound features operate in their "purest" form (i.e., default to a cluster range value of zero) on a single data element but can have cluster range values allowing the result of their evaluation to be influenced by surrounding data elements. In one instance, a cluster range value of zero yields a cluster area containing a single data element, while in an alternate instance, a cluster range value of one results in a cluster area containing all the data elements, in each applicable direction and dimension, within one unit (i.e., data element) of the subject data element.

At block 228 of FIG. 3, the compound feature processing action-on-detection attribute, which is the method of notification used to alert the user when a compound feature is positively identified for a given data element within the data set or selection therein, is assigned to the compound feature(s). In one instance, the user can choose to execute no processing action; to play a user-specified, preset, or automatically determined sound; to paint one or pluralities of activated data elements a user-specified, preset, or automatically determined color; or to execute another applicable, user-specified, preset, or automatically determined action. Within the realm of compound feature processing, there exist differences in the methodologies for executing the processing actions-on-detection of explicitly versus implicitly selected compound features. In one embodiment, for an implicitly selected compound feature, the associated feature action is not initiated upon positive identification; only the feature action associated with an explicitly selected compound feature is executed.

At block 230 of FIG. 3, the method 208 is complete.

Figure 4:
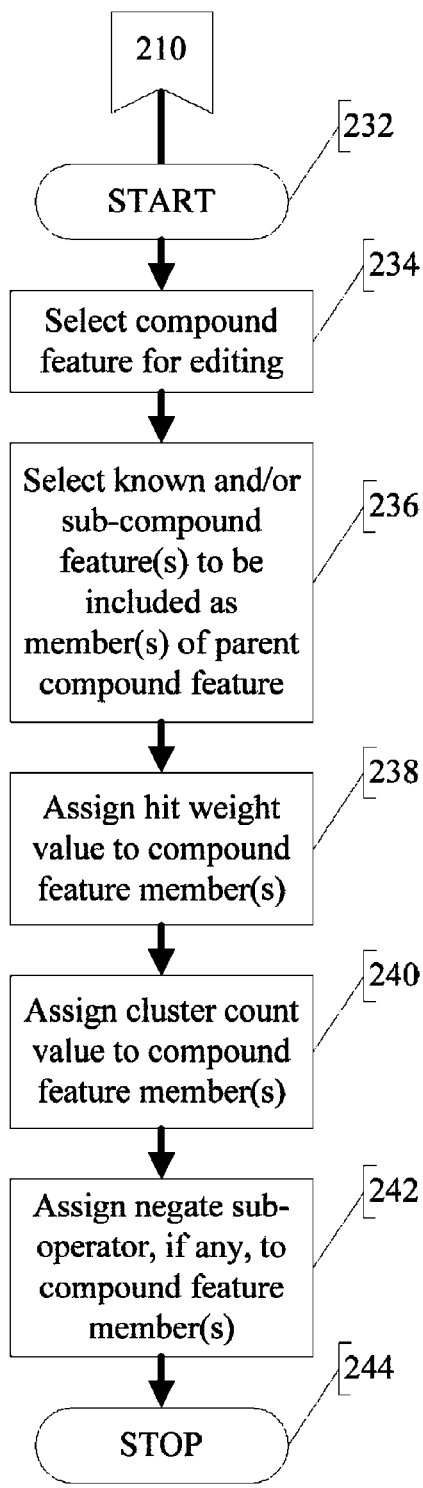
FIG. 4 shows an example method for editing one or pluralities of compound feature members.

FIG. 4 shows an example method 210 for editing the compound feature members. Preferably, for each new compound feature that is created, the associated members are defined and their associated properties set. The method 210 initializes at block 232, and at block 234 a compound feature is selected for editing. At block 236, one or pluralities of previously created and trained known features and/or sub-compound features are selected for inclusion as members of the parent compound feature (selected at block 234).

While only one logical base operator is attributable to any one compound feature at a given time, one or pluralities of sub-compound features, each with an associated logical base operator, can be included as members of a parent compound feature. As such, the sub-compound feature(s) is able to work in conjunction with its parent compound feature to ensure the proper inclusion or exclusion of logically complex compound feature members. In an example of the utility of sub-compound features, a positive hit for Compound Feature (CF) 1 at a given data element requires hits for Known Feature (KF) 1 OR KF2 and also hits for KF3 AND KF4 AND negated KF5 within the designated compound feature cluster range. Since individual parent compound features are limited to association with a single logical base operator, this example requires use of a sub-compound feature to aid in the accurate expression of the CF1 member relationships; this is shown in EQUATION 1.

$$CF2 = (KF1\ OR\ KF2);$$

$$CF1 = CF2\ AND\ [KF3\ AND\ KF4\ AND\ (NOT\ KF5)] \quad \text{EQUATION 1}$$

At block 238 of FIG. 4, a hit weight value is assigned to each compound feature member. Note that the hit weight property of a compound feature member is only relevant when the parent compound feature is associated with the logical base operator OR. Each compound feature member is assigned a hit weight value representing a percentage of the total hit weight required to positively activate a compound feature at a given data element. In one instance, the total hit weight percentage required for positive activation of the compound feature is set to 100%, while in an alternate instance the total hit weight percentage is set to any acceptable user-specified, preset, or automatically determined value. In some instances, the total hit weight percentage is irrelevant except that the user must know what percentage is required for activation prior to assigning hit weight values to compound feature members.

For example, some compound feature members are assigned hit weight values equal to 50% while others are assigned hit weight values equal to 100%; such a scenario is useful when attempting to improve system performance by avoiding evaluation of multiple levels of compound features. In another example, pluralities of indexes, each of which predicts a certain behavior, are established, and a compound feature is created to predict the behavior in a given data set. The historical accuracy for each index, which can be updated over time as additional data sets issue feedback, is known and is assigned to be the hit weight value for each index as a member of the compound feature. When sufficient indexes for a given data element predict that certain behavior is expected then the compound feature indicates that the behavior is expected. It is difficult to model this example as simple included compound features since changes in the hit weight values for each member can significantly change the sub-compound feature structure.

In yet another instance, a compound feature associated with the logical base operator OR positively activates when the hit weight values of its members exceed 100% at a given data element. In one example, the compound feature is comprised of KF1 with a hit weight value of 30% OR KF2 with a hit weight value of 75% OR KF3 with a non-specified, default hit weight value of 100%. Note that the hit weight value of a particular compound feature member defaults to 100% when it is not user-specified, preset, or on the occasion that the logical base operator AND is associated with the parent compound feature. The compound feature positively activates for a given data element when KF3 is present within the compound feature cluster range or when both KF1 and KF2 are present within the cluster range since the sum of their respective hit weight values (i.e., 30%+75%=105%) totals a hit weight value greater than or equal to the 100% required. Similarly, the compound feature fails to activate (i.e., misses) for the given data element if either KF1 or KF2 hits alone. In each of these scenarios, determination of whether a compound feature hits for a given data element is also contingent upon satisfaction of the other compound feature member attributes.

At block 240 of FIG. 4, a cluster count value is assigned to each compound feature member. A member's cluster count value is indicative of the least number of times said member must be present within the parent compound feature's associated cluster range in order for the compound feature member to contribute its hit weight value to the parent compound feature's total hit weight. When the member's cluster count value is set to zero, this indicates that a single instance of the member in the cluster range of the parent compound feature is adequate for contribution of the member's hit weight value. In contrast, when the member's cluster count value is set to one (or another user-specified, preset, or automatically determined value), this indicates that the member must hit at least twice (i.e., hit-count-value-plus-one times) within the cluster range of the parent compound feature in order to contribute its hit weight value to the parent compound feature's total hit weight.

At block 242 of FIG. 4, a negate sub-operator is optionally assigned to each compound feature member. It is possible for a compound feature to include any number of positive and/or negated members. If a positive member has a set cluster count value, that member must appear at least cluster-count-value-plus-one times within the applicable cluster range of the parent compound feature in order for the member to contribute its hit weight value to the compound feature. The negation (NOT) sub-operator as applied to a compound feature member functions to negate the member and its associated cluster count value, if applicable. For example, a compound feature associated with the logical base operator AND is comprised of positive members KF1 AND KF2 AND negated-member KF3. Simply, KF1 and KF2 must hit cluster-count-plus-one times within the cluster range of the parent compound feature in order to contribute their associated hit weight values to the compound feature. However, negated-member KF3 with a cluster count value of zero infers that a single hit for KF3 within the parent compound feature cluster range results in a miss for the parent compound feature at the given data element. Negated KF3 with a cluster count value greater than zero infers that cluster-count-plus-one hits for KF3 within the cluster range results is a miss for the parent compound feature at the given data element.

At block 244 of FIG. 4, the method 210 is complete.

Figure 5:
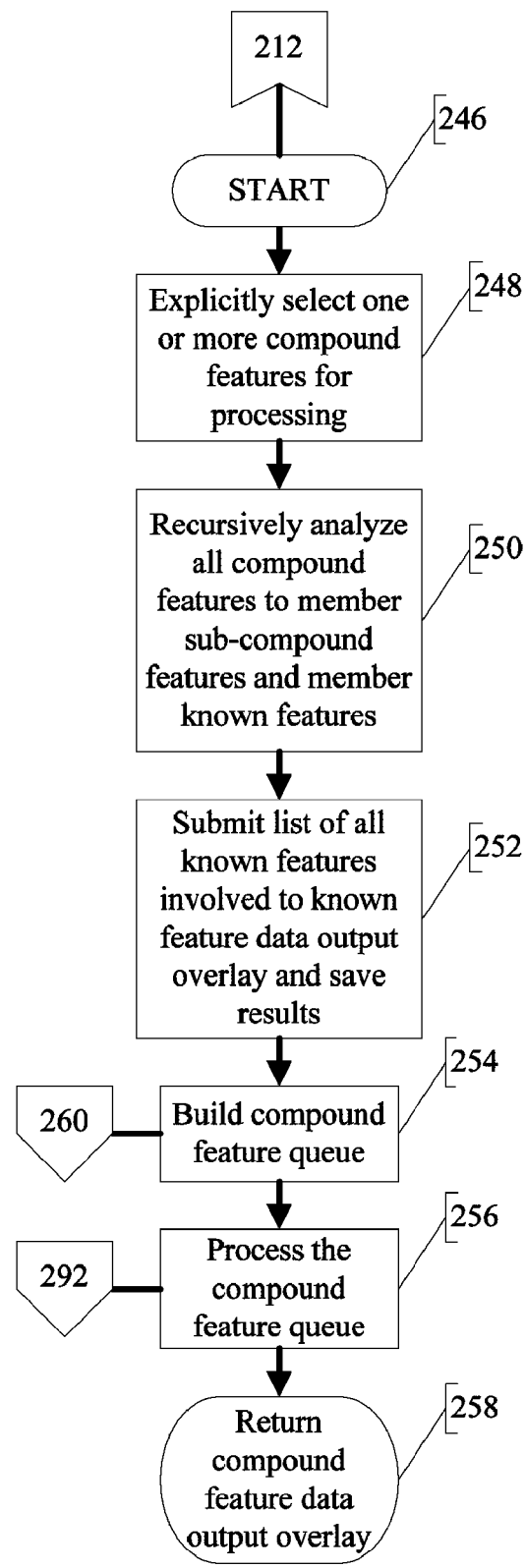
FIG. 5 shows an example method for processing an explicitly selected compound feature.

FIG. 5 shows an example method 212 for processing one or pluralities of explicitly selected compound features. The method 212 initializes at block 246, and at block 248 one or pluralities of compound features are explicitly selected by the user for processing using a data analysis and feature recognition system, such as disclosed by Brinson, et al., in U.S. patent application 2007/0244844 or as accomplished by any acceptable application or engine intended for use in the same or a similar manner. An explicitly selected compound feature is one that is intentionally selected by the user for processing; alternately, an implicitly selected compound feature is included in processing due to the requisite processing requirements of an explicitly selected compound feature. In one embodiment, the user identifies the compound feature selection; in an alternate embodiment, the selection is automatically identified using one or pluralities of applicable evaluation algorithms or some other acceptable user-specified, preset, or automatically determined method or means intended for use in the same or a similar manner.

The creation of compound features requires an existing pool of known features from which to derive. Similarly, compound feature processing is a series of post-processing executions performed after known feature processing. Accordingly, whether the compound feature is explicitly or implicitly selected, compound feature processing must automatically include any constituent sub-compound features and/or known features. In one embodiment, the processing order of the explicitly and/or implicitly selected compound features is hard-coded, if, for example, the processing is repetitious, routine, or consistently uses the same compound features, while in an alternate embodiment the processing order is user-specified, preset, or automatically determined. Preferably, the processing order of the compound features is based upon the assignment of processing wave numbers, which are dependent upon the level of compound feature member nesting; this is described in more detail with reference to FIG. 6.

At block 250 of FIG. 5, explicitly selected compound features are recursively analyzed down to their respective member sub-compound features and then ultimately to member known features as a requirement prior to initialization of compound feature processing. At block 252, the listing of member known features is submitted to the known feature data output overlay, which is previously generated during standard data analysis and feature recognition exercises. Here, the known feature data output overlay, which is sized and addressed in the same manner as the original data set or selection therein, functions as a resource for known feature hits within the subject data set; the known feature hits are retrieved and returned to the compound feature processing engine for use later during compound feature processing.

At block 254 of FIG. 5, the compound feature queue, which functions to store the processing wave execution order for the explicitly selected compound feature(s) and their associated sub-compound feature(s), is built; this is described in more detail with reference to FIG. 6. At block 256, the compound feature queue is processed; this is described in more detail with reference to FIGS. 7-15. At block 258, the completed compound feature data output overlay, which functions to relay the compound feature hits as found during processing, is returned, and the method 212 is complete.

Figure 6:
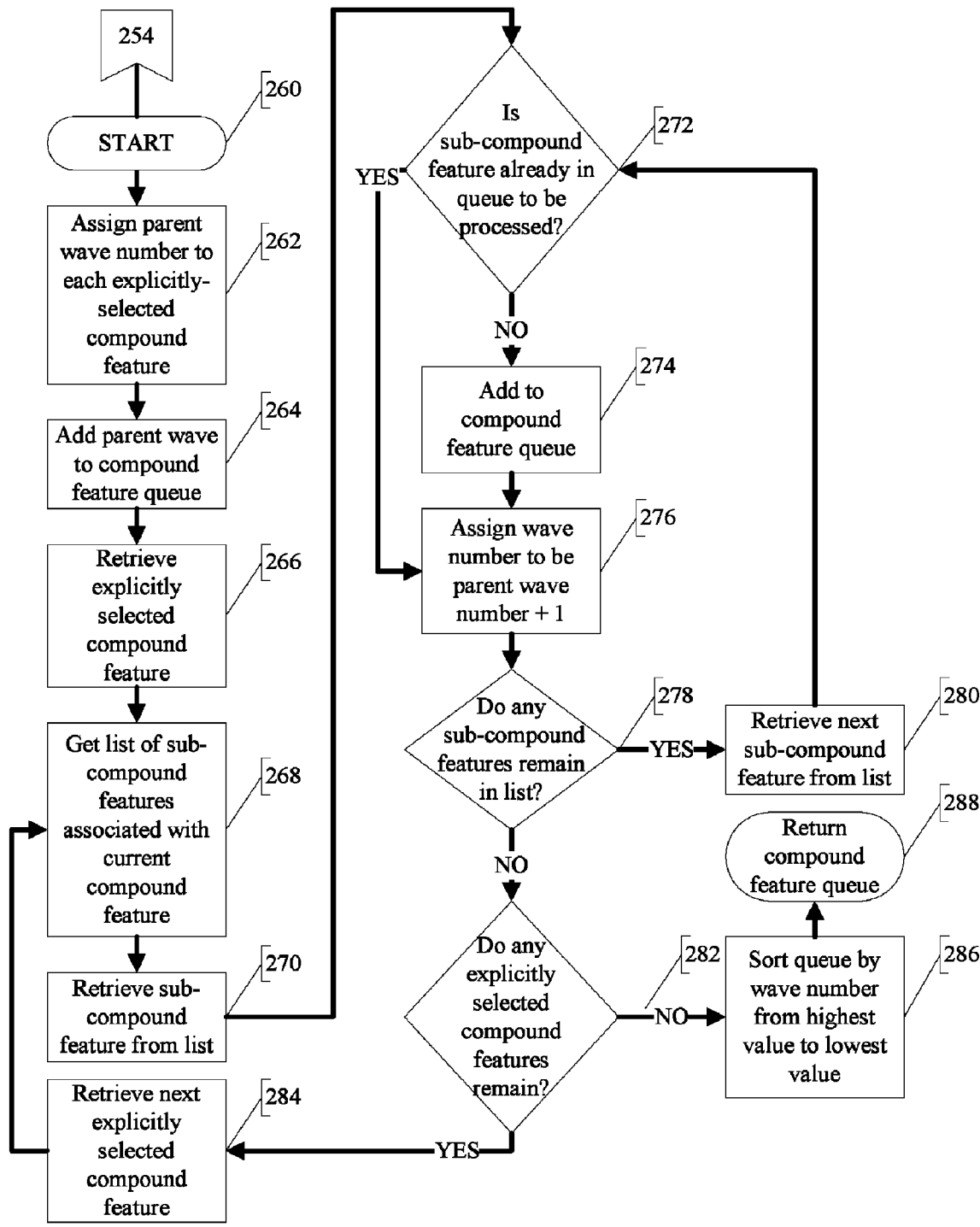
FIG. 6 shows an example method for building a compound feature queue.

FIG. 6 shows an example method 254 for building a compound feature queue. The method 254 initializes at block 260, and at block 262 the parent processing wave number is assigned to each explicitly selected compound feature. In one instance, the parent processing wave number is set to one, while in an alternate instance, the parent processing wave number is set to any user-specified, preset, or automatically determined number. At block 264, the parent processing wave is added to the compound feature queue. At block 266, an explicitly selected compound feature, as selected at block 248 of FIG. 5, is retrieved. At block 268, the list of the member sub-compound features associated with the current compound feature is retrieved. At block 270, a member sub-compound feature is retrieved from the list. At block 272, a decision is made as to whether the current member sub-compound feature is already in the compound feature queue to be processed. If YES at block 272, the method 254 proceeds to block 276. If NO at block 272, at block 274 the current member sub-compound feature is added to the compound feature queue. At block 276, the member sub-compound feature's processing wave number is assigned to be the parent processing wave number plus one, and the method 254 proceeds to block 278.

At block 278 of FIG. 6, a decision is made as to whether any member sub-compound features remain in the list of member sub-compound features, which was retrieved at block 268. If YES at block 278, at block 280 the next member sub-compound feature associated with the current compound feature is retrieved from the list, and the method 254 returns to block 272. If NO at block 278, at block 282 a decision is made as to whether any explicitly selected compound features remain. If YES at block 282, at block 284 the next explicitly selected compound feature, as selected at block 248 of FIG. 5, is retrieved, and the method 254 returns to block 268. If NO at block 282, at block 286 the compound feature queue is sorted by processing wave from highest wave number to lowest wave number. At block 288 the completed compound feature queue is returned, and the method 254 is complete.

Figure 7:
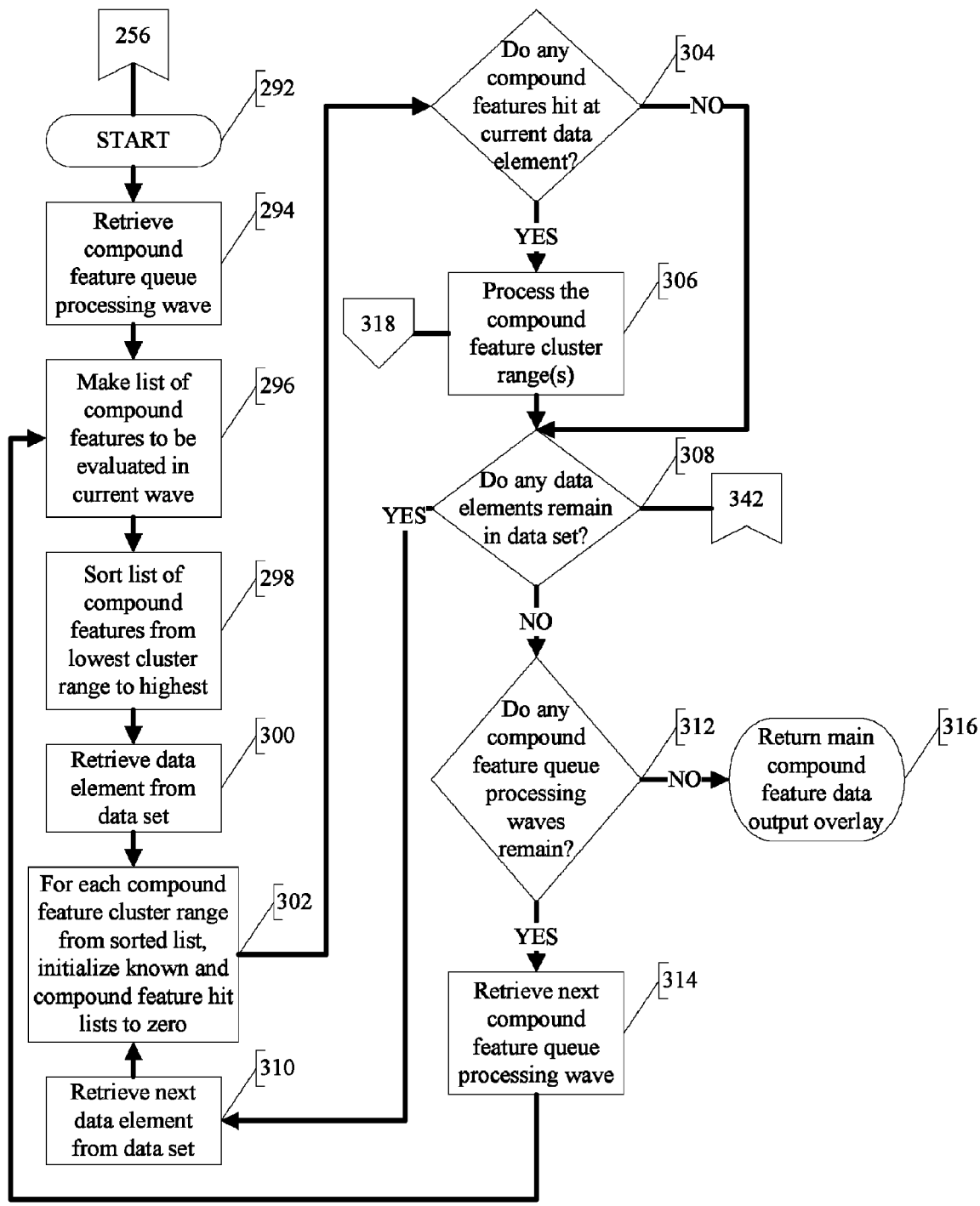
FIG. 7 shows an example method for processing a compound feature queue.

FIG. 7 shows an example method 256 for processing the compound feature queue. The method 256 initializes at block 292, and at block 294 a compound feature queue processing wave is retrieved. At block 296, a list of all compound features to be evaluated during the current processing wave is made. At block 298, the list of compound features is sorted from lowest cluster range value to highest cluster range value. At block 300, a data element is retrieved from the data set. At block 302, the known feature and compound feature hit lists for each compound feature cluster range of the sorted list of compound features are initialized to zero. At block 304, a decision is made as to whether any compound features hit at the current data element. If YES at block 304, at block 306 the compound feature cluster range(s) is processed; this is described in more detail with reference to FIGS. 8-15. The method 256 then proceeds to block 308. If NO at block 304, at block 308 a decision is made as to whether any data elements remain in the data set. If YES at block 308, at block 310 the next data element is retrieved from the data set, and the method 256 returns to block 302. If NO at block 308, at block 312 a decision is made as to whether any compound feature queue processing waves remain. If YES at block 312, at block 314 the next compound feature queue processing wave is retrieved, and the method 256 returns to block 296. If NO at block 312, at block 316 the main compound feature data output overlay is returned.

Figure 8:
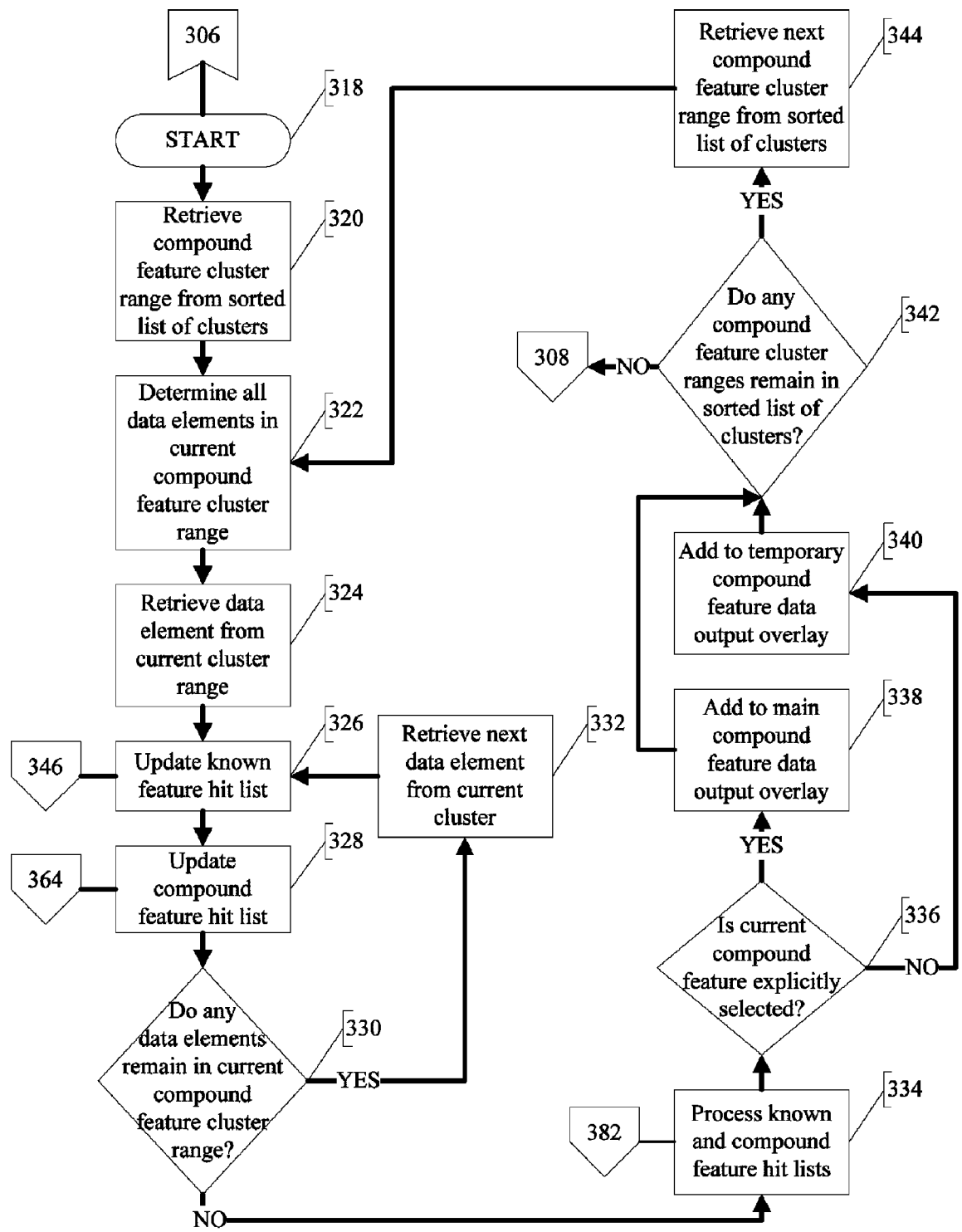
FIG. 8 shows an example method for processing a compound feature cluster range.

FIG. 8 shows an example method 306 for processing the compound feature cluster range(s). The method 306 initializes at block 318, and at block 320 a compound feature cluster range is retrieved from the list of compound features sorted by cluster range (as determined at block 298 of FIG. 7). At block 322, all the data elements present within the current compound feature cluster range are determined. At block 324, a data element is retrieved from the current compound feature cluster range. At block 326, the known feature hit list is updated; this is described in more detail with reference to FIG. 9. At block 328, the compound feature hit list is updated; this is described in more detail with reference to FIG. 10. At block 330, a decision is made as to whether any data elements remain in the current compound feature cluster range. If YES at block 330, at block 332 the next data element is retrieved from the current compound feature cluster range, and the method 306 returns to block 326. If NO at block 330, at block 334, the known and compound feature hit lists are processed; this is described in more detail with reference to FIGS. 11-15. At block 336, a decision is made as to whether the current compound feature is explicitly selected for processing. If YES at block 336, at block 338 the compound feature hit counts are added to the main compound feature data output overlay, and the method 306 proceeds to block 342. If NO at block 336, at block 340 the compound feature hit counts are added to the temporary compound feature data output overlay, and the method 306 proceeds to block 342.

At block 342 of FIG. 8, a decision is made as to whether any compound feature cluster ranges remain in the list of compound features sorted by cluster range (as determined at block 298 of FIG. 7). If YES at block 342, at block 344 the next compound feature cluster range is retrieved from the list of compound features sorted by cluster range, and the method 306 returns to block 322. If NO at block 342, the method returns to block 308 of FIG. 7.

Figure 9:
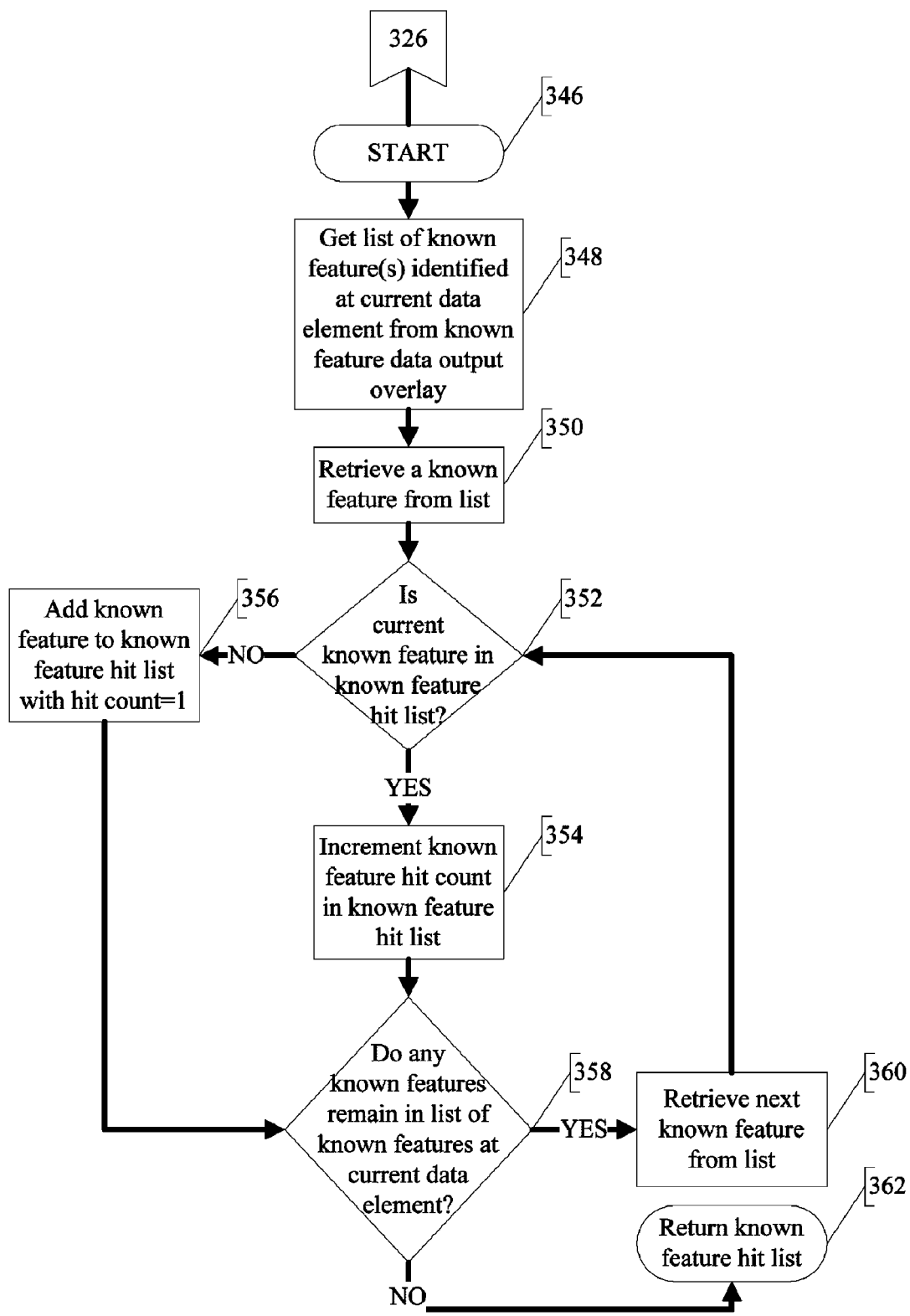
FIG. 9 shows an example method for updating a known feature hit list.

FIG. 9 shows an example method 326 for updating the known feature hit list. The method 326 initializes at block 346 and at block 348 the list of known features identified for the current data element are retrieved from the known feature data output overlay. At block 350, a known feature is retrieved from the list of identified known features. At block 352, a decision is made as to whether the current known feature is present in the known feature hit list. If YES at block 352, at block 354 the hit count of the current known feature is incremented in the known feature hit list, and the method 326 proceeds to block 358. If NO at block 352, at block 356 the current known feature is added to the known feature hit list with a hit count equal to one, and the method 326 proceeds to block 358.

At block 358 of FIG. 9, a decision is made as to whether any known features remain in the list of known features identified for the current data element. If YES at block 358, at block 360 the next known feature is retrieved from the list of identified known features, and the method 326 returns to block 352. If NO at block 358, at block 362 the known feature hit list is returned, and the method 326 is complete.

Figure 10:
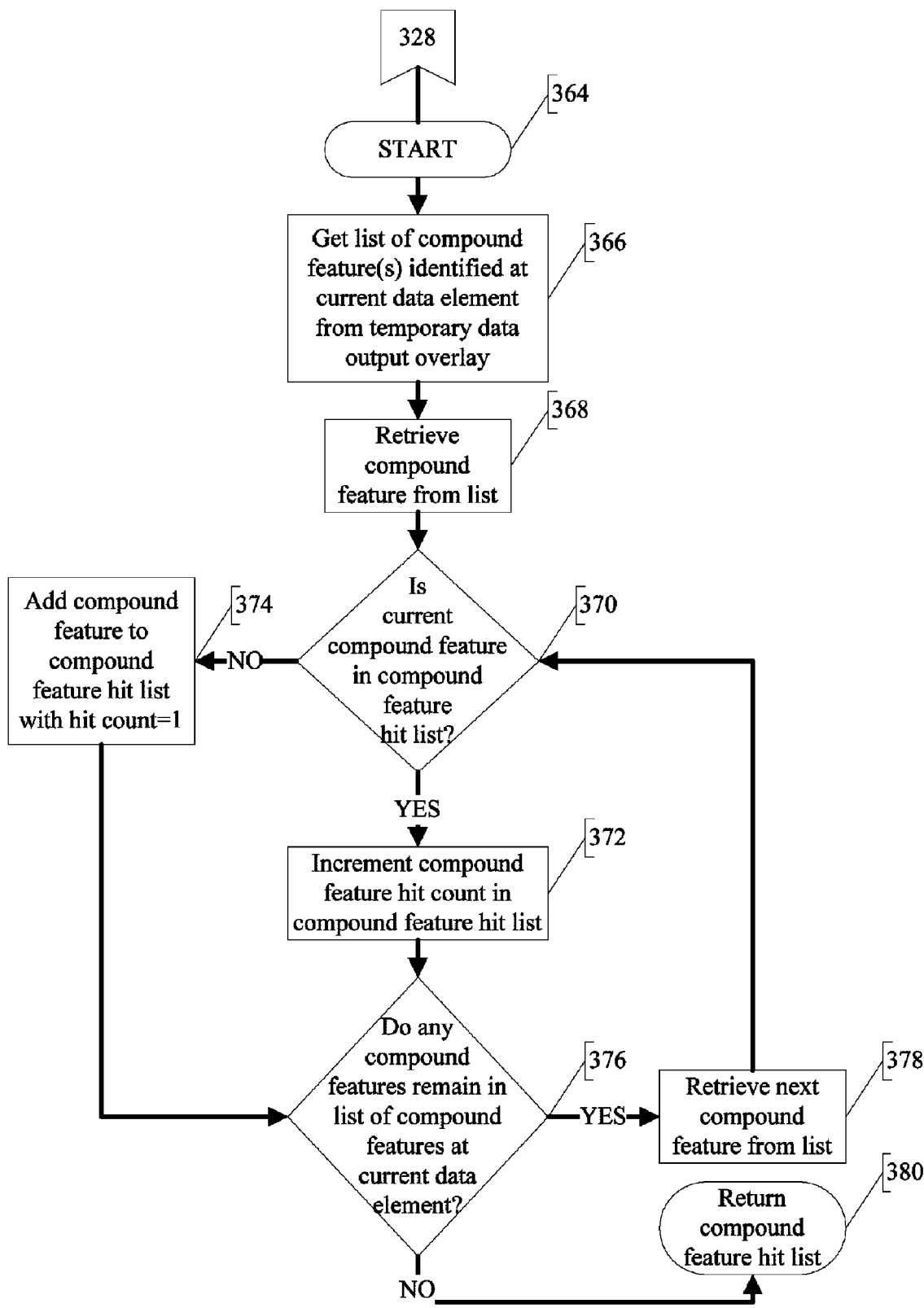
FIG. 10 shows an example method for updating a compound feature hit list.

FIG. 10 shows an example method 328 for generating a compound feature hit list. The method 328 initializes at block 364 and at block 366 the list of compound features identified for the current data element are retrieved from the temporary data output overlay. At block 368, a compound feature is retrieved from the list of identified compound features. At block 370, a decision is made as to whether the current compound feature is present in the compound feature hit list. If YES at block 370, at block 372 the hit count of the current compound feature is incremented in the compound feature hit list, and the method 328 proceeds to block 376. If NO at block 370, at block 374 the current compound feature is added to the compound feature hit list with a hit count equal to one, and the method 328 proceeds to block 376.

At block 376 of FIG. 10, a decision is made as to whether any compound features remain in the list of compound features identified for the current data element. If YES at block 376, at block 378 the next compound feature is retrieved from the list of identified compound features, and the method 328 returns to block 370. If NO at block 376, at block 380 the compound feature hit list is returned, and the method 328 is complete.

Figure 11:
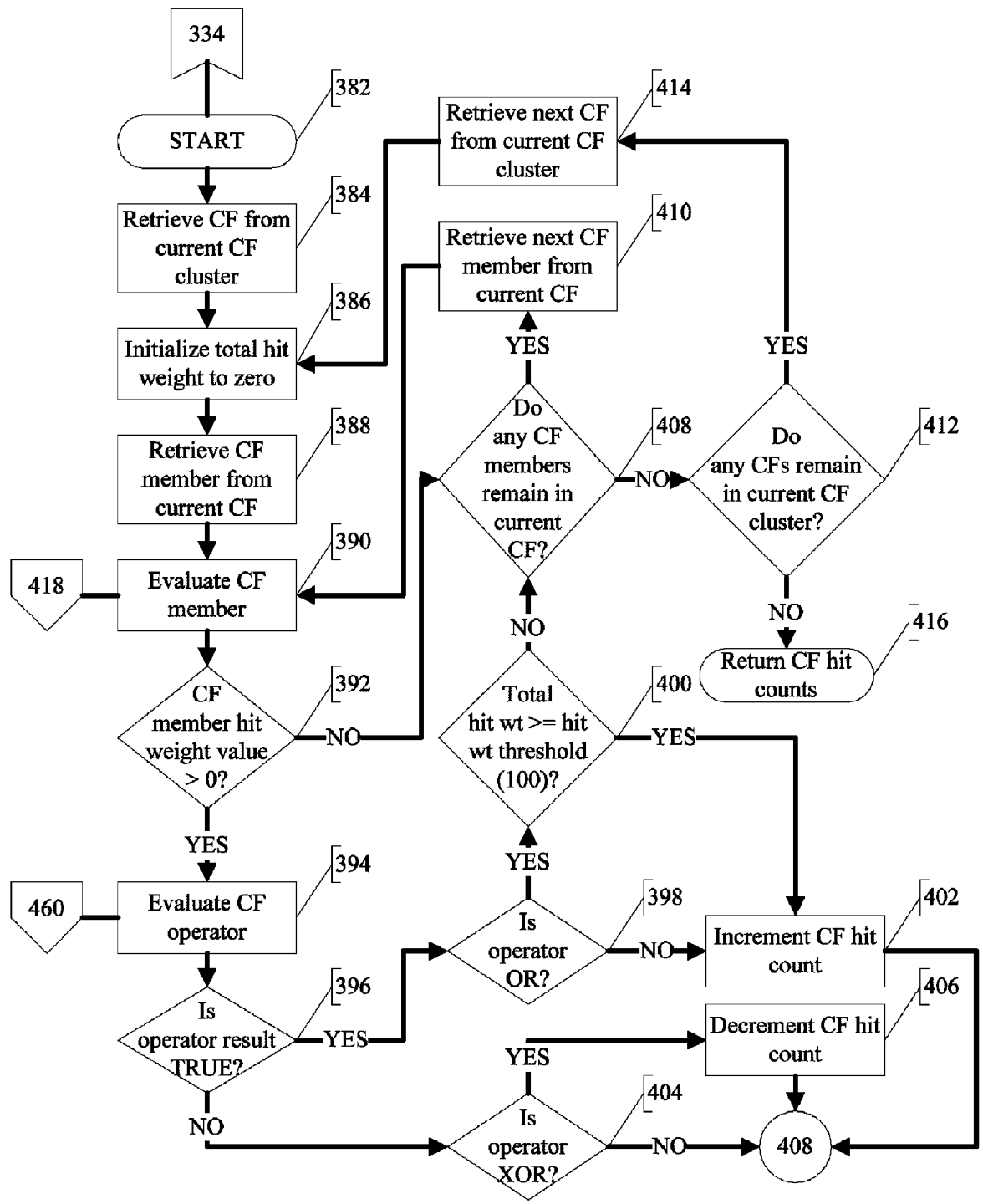
FIG. 11 shows an example method for processing the known feature and compound feature hit lists.

FIG. 11 shows an example method 334 for processing the known feature hit list and the compound feature hit list. The method 334 initializes at block 382, and at block 384 a compound feature is retrieved from the current compound feature cluster range. At block 386, the compound feature total hit weight value, which is the effective compound feature member hit weight at an instantaneous moment in time, is initialized to zero. At block 388, a compound feature member is retrieved from the current compound feature. At block 390, the compound feature member is evaluated; this is described in more detail with reference to FIGS. 12-14. At block 392, a decision is made as to whether the compound feature member hit weight value is greater than zero. If YES at block 392, at block 394 the compound feature operator is evaluated; this is described in more detail with reference to FIG. 15. The method 334 then proceeds to block 396. If NO at block 392, the method 334 proceeds to block 408.

At block 396 of FIG. 11, a decision is made as to whether the logical base operator result is TRUE. If YES at block 396, the method 334 proceeds to block 398; if NO at block 396, the method 334 proceeds to block 404.

At block 398 of FIG. 11, a decision is made as to whether the logical base operator is OR. If YES at block 398, the method 334 proceeds to block 400; if NO at block 398, the method 334 proceeds to block 402.

At block 400 of FIG. 11, a decision is made as to whether the compound feature total hit weight value is greater than or equal to the hit weight threshold value (e.g., 100). If YES at block 400, at block 402 the compound feature hit count is incremented, and the method 334 proceeds to block 408. If NO at block 400, the method 334 proceeds to block 408.

At block 404 of FIG. 11, a decision is made as to whether the logical base operator is XOR. If YES at block 404, at block 408 the compound feature hit count is decremented, and the method 334 proceeds to block 408. If NO at block 404, the method 334 proceeds to block 408.

At block 408 of FIG. 11, a decision is made as to whether any compound feature members remain in the current compound feature. If YES at block 408, at block 410 the next compound feature member is retrieved from the current compound feature, and the method 334 returns to block 390. If NO at block 408, at block 412 a decision is made as to whether any compound features remain in the current compound feature cluster range. If YES at block 412, at block 414 the next compound feature is retrieved from the current compound feature cluster range, and the method 334 returns to block 386. If NO at block 412, at block 416 the compound feature hit counts are returned, and the method 334 is complete.

Figure 12:
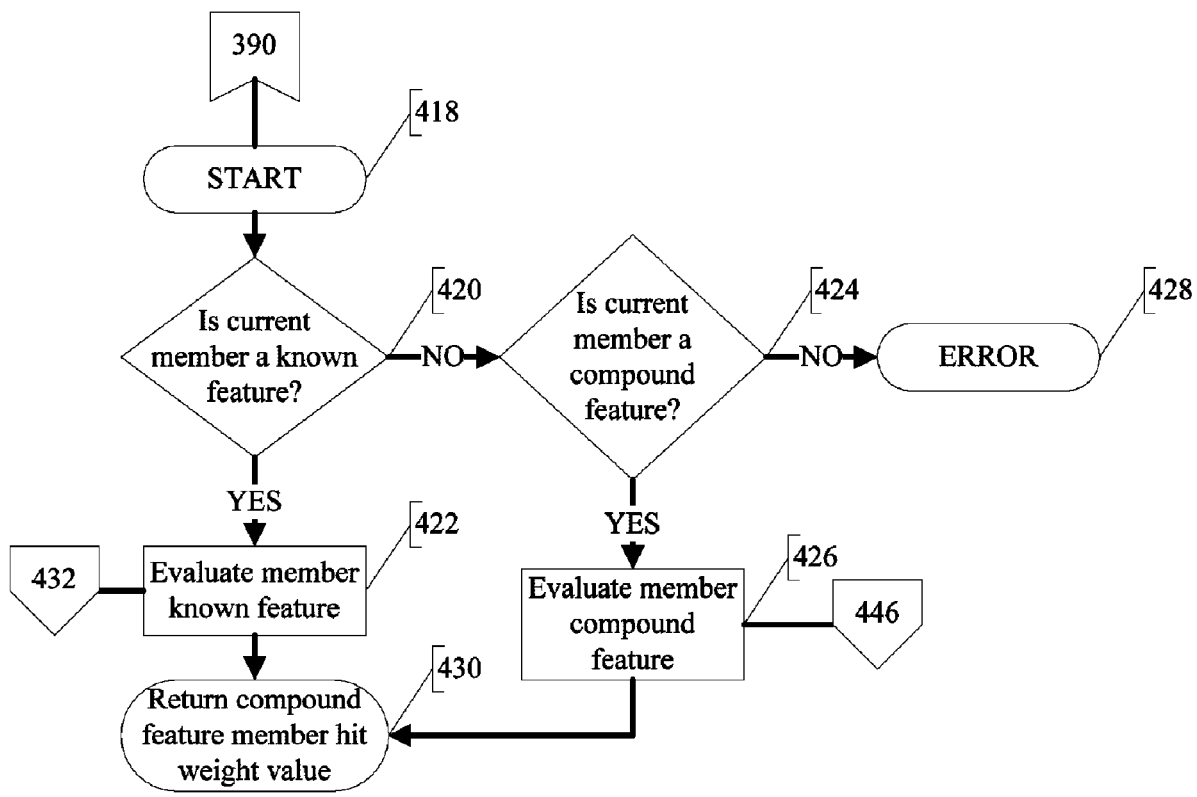
FIG. 12 shows an example method for evaluating the compound feature member(s)

FIG. 12 shows an example method 390 for evaluating the compound feature member(s). The method 390 initializes at block 418, and at block 420 a decision is made as to whether the current compound feature member is a known feature. If YES at block 420, at block 422 the member known feature is evaluated; this is described in more detail with reference to FIG. 13. The method 390 then proceeds to block 430. If NO at block 420, at block 424 a decision is made as to whether the current compound feature member is a compound feature. If YES at block 424, at block 426 the member compound feature is evaluated; this is described in more detail with reference to FIG. 14. The method 390 then proceeds to block 430. If NO at block 424, at block 428 an ERROR is returned, and the method 390 is complete.

At block 430 of FIG. 12, the compound feature member hit weight value is returned, and the method 390 is complete.

Figure 13:
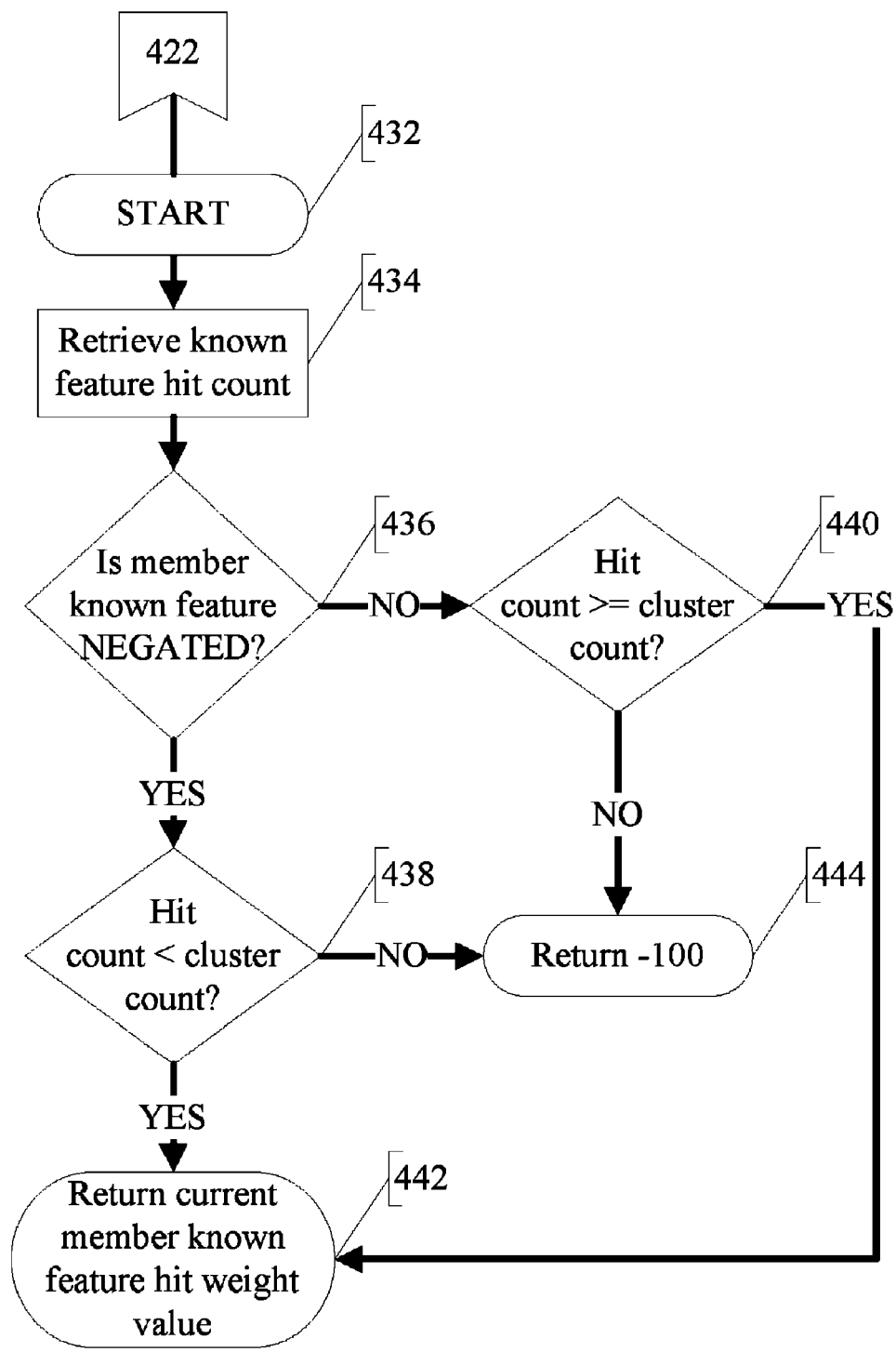
FIG. 13 shows an example method for evaluating a compound feature member known feature.

FIG. 13 shows an example method 422 for evaluating the member known feature(s) of a given compound feature. The method 422 initializes at block 432, and at block 434 the known feature hit count is retrieved from the known feature hit list. At block 436, a decision is made as to whether the member known feature is associated with the negate sub-operator property. If YES at block 436, the method 422 proceeds to block 438; if NO at block 436, the method 422 proceeds to block 440.

At block 438 of FIG. 13, a decision is made as to whether the member known feature hit count value is less than its cluster count value (as determined at block 240 of FIG. 5). If YES at block 438, the method 422 proceeds to block 442; if NO at block 438, the method 422 proceeds to block 444.

At block 440 of FIG. 13, a decision is made as to whether the member known feature hit count value is greater than or equal to its cluster count value (as determined at block 240 of FIG. 5). If YES at block 440, at block 442 the member known feature hit weight value is returned, and the method 422 is complete. If NO at block 440, at block 444 the member known feature hit weight value of (−100), which is indicative of no hit, is returned, and the method 422 is complete.

Figure 14:
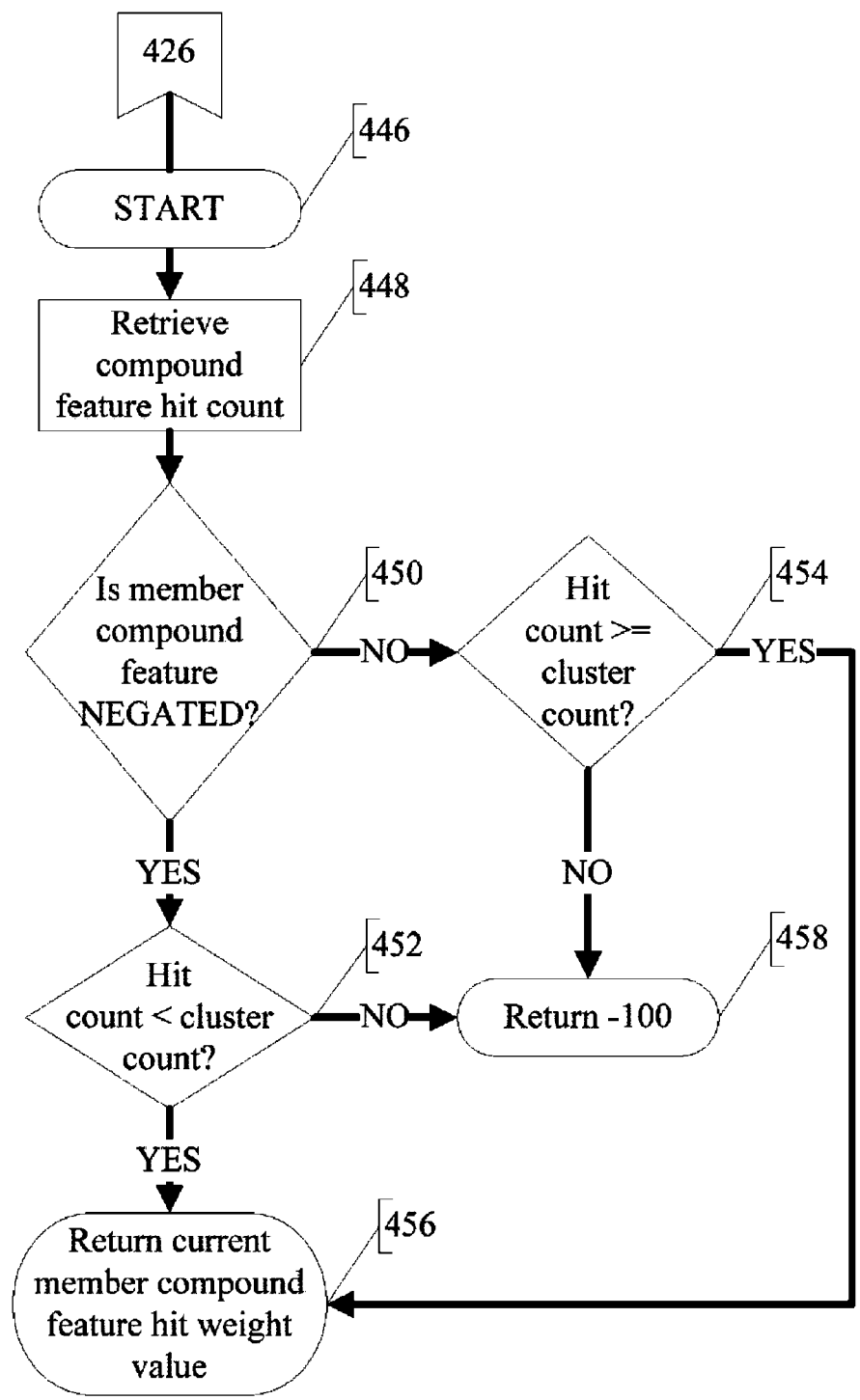
FIG. 14 shows an example method for evaluating a compound feature member compound feature.

FIG. 14 shows an example method 426 for evaluation of the member compound feature(s) of a given compound feature. The method 426 initializes at block 446, and at block 448 the compound feature hit count value is retrieved from the compound feature hit list. At block 450, a decision is made as to whether the member compound feature is associated with the negate sub-operator. If YES at block 450, the method 426 proceeds to block 452; if NO at block 450, the method 426 proceeds to block 454.

At block 452 of FIG. 14, a decision is made as to whether the member compound feature hit count value is less than its cluster count value (as determined at block 240 of FIG. 5). If YES at block 452, the method 426 proceeds to block 456; if NO at block 452, the method 426 proceeds to block 458.

At block 454 of FIG. 14, a decision is made as to whether the member compound feature hit count value is greater than or equal to its cluster count value (as determined at block 240 of FIG. 5). If YES at block 452, at block 456 the member compound feature hit weight value is returned, and the method 426 is complete. If NO at block 452, at block 458 the member compound feature hit weight value of (−100), which is indicative of no hit, is returned, and the method 426 is complete.

Figure 15:
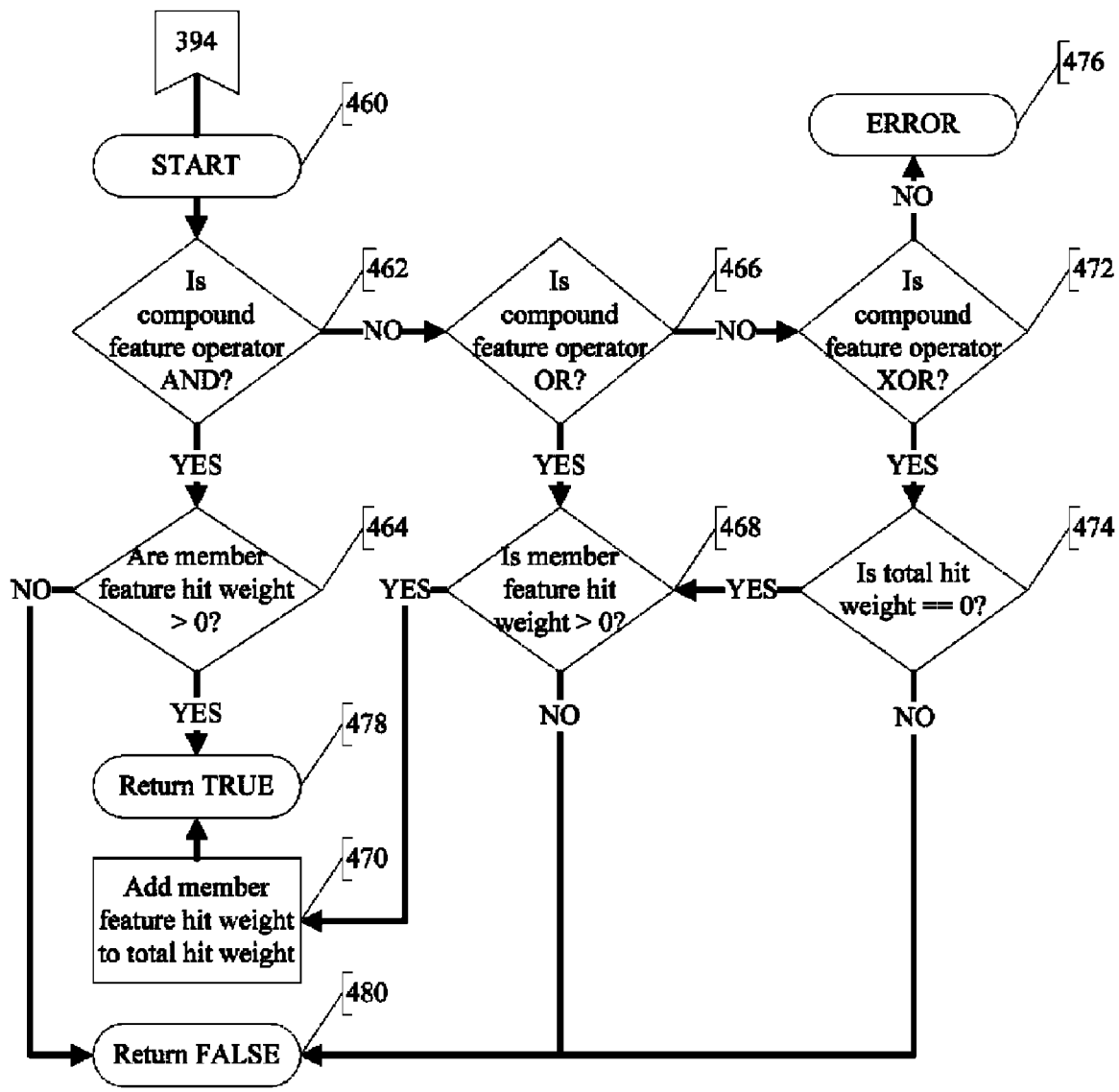
FIG. 15 shows an example method for evaluating the compound feature associated logical base operator.

FIG. 15 shows an example method 394 for evaluating the compound feature logical base operator. The method 394 initializes at block 460, and at block 462, a decision is made as to whether the current compound feature is associated with the logical base operator AND. If YES at block 462, the method 394 proceeds to block 464; if NO at block 462, the method 394 proceeds to block 466.

At block 464 of FIG. 15, a decision is made as to whether the member feature of the current compound feature has a hit weight value greater than zero. If YES at block 464, the method 394 proceeds to block 478; if NO at block 464, the method 394 proceeds to block 480.

At block 466 of FIG. 15, a decision is made as to whether the current compound feature is associated with the logical base operator OR. If YES at block 466, the method 394 proceeds to block 468; if NO at block 466, the method 394 proceeds to block 472.

At block 468 of FIG. 15, a decision is made as to whether the member feature of the current compound feature has a hit weight value greater than zero. If YES at block 468, at block 470 the hit weight value of the current member feature is added to the total hit weight value of the compound feature, and the method 394 proceeds to block 478. If NO at block 468, the method 394 proceeds to block 480.

At block 472 of FIG. 15, a decision is made as to whether the current compound feature is associated with the logical base operator XOR. If YES at block 472, the method 394 proceeds to block 474. If NO at block 472, at block 476 an ERROR is returned, and the method 394 is complete.

At block 474 of FIG. 15, a decision is made as to whether the total hit weight value of the current compound feature is equal to zero. If YES at block 474, the method returns to block 468; if NO at block 474, the method 394 proceeds to block 480.

At block 478 of FIG. 15, a value of TRUE is returned, and the method 394 is complete. At block 480, a value of FALSE is returned, and the method 394 is complete.

Figure 16:
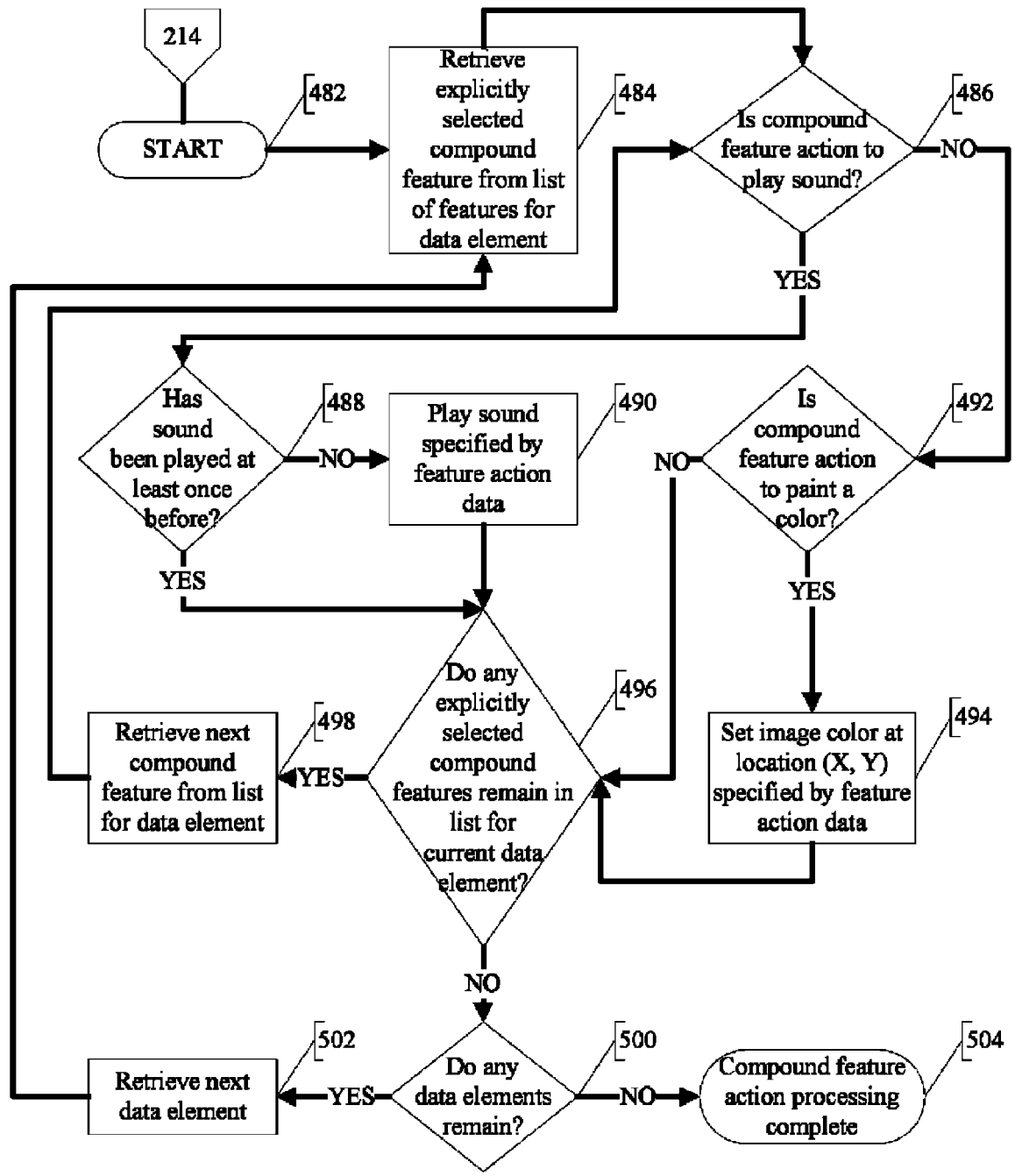
FIG. 16 shows an example method for performing the compound feature action-on-detection.

FIG. 16 shows an example method 214 for performing feature actions-on-detection for the list of positively activated, explicitly selected compound features. Note that setting of the compound feature attributes, including feature actions, is described in more detail with reference to block 228 of FIG. 3. The method 214 initializes at block 482, and at block 484 an explicitly selected compound feature is retrieved from the list of features for a given data element. At block 486, a decision is made as to whether the compound feature is associated with the feature action-on-detection to play a user-specified, preset, or automatically determined sound. If YES at block 486, the method 214 proceeds to block 488; if NO at block 486, the method 214 proceeds to block 492.

At block 488 of FIG. 16, a decision is made as to whether the user-specified, preset, or automatically determined sound has been played by the system at least once before. If YES at block 488, the method 214 proceeds to block 496; if NO at block 488, at block 490 the sound specified by the compound feature action data is played, and the method 214 proceeds to block 496.

At block 492 of FIG. 16, a decision is made as to whether the compound feature is associated with the feature action-on-detection to paint one or pluralities of activated data elements a user-specified, preset, or automatically determined color. If YES at block 492, at block 494 the image color, which is specified by the feature action data, is set at the given data element location (X, Y), and the method 214 proceeds to block 496. If NO at block 492, the method 214 proceeds to block 496. In one embodiment, the compound feature processing actions may not be limited to playing a sound or painting a color as is indicated here; in alternate embodiments, the compound feature processing action may include any user-specified, preset, or automatically determined action deemed to be appropriate or useful by a user of the system.

At block 496 of FIG. 16, a decision is made as to whether any explicitly selected compound features remain in the list of features for the given data element. If YES at block 496, at block 498 the next explicitly selected compound feature is retrieved from the list of features for the given data element and the method 214 returns to block 486. If NO at block 496, at block 500 a decision is made as to whether any data elements remain. If YES at block 500, at block 502 the next data element is retrieved, and the method 214 returns to block 484. If NO at block 500, at block 504 compound feature action processing is complete, and the method 214 is complete.

For illustrative purposes, the creation, identification, and processing of one or pluralities of compound features as disclosed herein is exemplified with reference to the imagery example as shown in FIGS. 17-25.

In one instance, a series of known features (e.g., KF1, KF2, KF3, KF4, KF5, KF6), which are inherent to an original data set selection, are created, and the unique data values and patterns corresponding to each are trained into an algorithm datastore, or any user-specified, preset, or automatically determined storage device capable of at least temporarily storing data, using one or pluralities of evaluation algorithms and a given TDA. During known feature processing, a new data set or selection therein is searched for the characteristic data values and patterns inherent to any of the previously trained known features. Any matching data values and patterns, which imply the identification of the respective known feature(s) within the data set selection, are then reported to the processing engine via a known feature data output overlay, which is sized and addressed in the same manner as the subject data set selection and functions to record each positive known feature hit for each applicable data element in the data selection.

FIG. 17 shows an example data array representing one embodiment of a known feature data output overlay. In this instance, it is presumed that each table cell or data element corresponds to a data element in the original data set selection. In this instance, each data element of the known feature data output overlay is labeled with the known feature(s) identified there.

FIG. 18 shows an example data table containing three compound features (i.e., CF1, CF2, and CF3) that are scheduled for processing using an embodiment of the present invention.

In this example, Compound Feature 1 (hereafter "CF1"), which has a cluster range value of one, is implicitly selected for processing and is comprised of Known Feature 1 (hereafter "KF1") with a cluster count value of one; and Known Feature 2 (hereafter "KF2") with a cluster count value of one; and negated Known Feature 3 (hereafter "KF3") with a cluster count value of zero. Accordingly, a positive hit for CF1 at a given data element requires at least two hits each for KF1 and KF2 and no hits for KF3 within the CF1 cluster range of one.

Compound Feature 2 (hereafter "CF2"), which has a cluster range value of two, is implicitly selected for processing and is comprised of CF1 with a cluster count value of zero and a hit weight value of 100; or Known Feature 4 (hereafter "KF4") with a cluster count value of zero and a hit weight value of 100; or Known Feature 5 (hereafter "KF5") with a cluster count value of zero and a hit weight value of 50; or Known Feature 6 (hereafter "KF6") with a cluster count value of one and a hit weight value of 50. Accordingly, a positive hit for CF2 at a given data element is achieved in one of three ways: (1) CF1 hits at least once within the CF2 cluster range value of two; (2) KF4 hits at least once within the CF2 cluster range value of two; or (3) KF5 hits at least once and KF6 hits at least twice within the CF2 cluster range value of two.

Compound Feature 3 (hereafter "CF3"), which has a cluster range value of one, is explicitly selected for processing and is comprised of CF2, with a cluster count value of one and a hit weight value of 100; XOR KF3, with a cluster count value of 0 and a hit weight value of 100. Accordingly, a positive hit for CF3 at a given data element is achieved in two possible ways: (1) CF2 hits at least twice while KF3 does not hit within the CF3 cluster range of one; or (2) KF3 hits at least once while CF2 does not hit within the CF3 cluster range of one.

In one instance, recursive analysis of all members of explicitly-selected CF3 reveals a listing of participating known features, including KF1, KF2, KF3, KF4, KF5, and KF6. This list is submitted to the known feature data output overlay of FIG. 15, and the results of this known feature processing are saved.

FIG. 19 shows an example data table of the compound feature queue. The implicitly and explicitly selected compound features are organized into a compound feature queue, which is ordered by processing wave number. For this example, explicitly selected CF3 is assigned to parent processing wave 1; CF2, which is a member of CF3, is assigned to processing wave 2 (i.e., parent processing wave 1 plus 1); and CF1, which is a member of CF2, is assigned to processing wave 3 (i.e., parent processing wave 2 plus 1). The queue is sorted from highest processing wave number to lowest. In this instance, CF1 is processed first and is followed by CF2 and finally CF3.

In one instance, queue processing begins with processing wave 3, which for this example includes evaluation of CF1 with a cluster range value of one. For each compound feature cluster range of the given processing wave (i.e., cluster range value of one for processing wave 3), the known feature and compound feature hit lists are initialized to zero for each data element in the data set selection. A determination is then made as to whether any compound feature members (i.e., KF1, KF2, or KF3 for CF1) hit at the data elements of the data set selection. For this example, data elements (1, 1), (4, 1), (1, 2), (3, 2), (4, 2), (5, 2), (1, 3), (3, 3), (4, 3), (1, 4), (1, 5), and (2, 5) are deemed "valid" for CF1 processing as each records at least one hit for either KF1, KF2, and/or KF3. Once these "valid" data elements are determined, surrounding data elements, which fall within one data element in each applicable direction and dimension of the valid data elements, are surmised. For this example, data elements (2, 1), (1, 2), and (2, 2) lay within the CF1 cluster range value of valid data element (1, 1); data elements (3, 1), (5, 1), (3, 2), (4, 2), and (5, 2) lay within the CF1 cluster range value of valid data element (4, 1); etc.

In one instance, for each data element within the current cluster range value of a given valid data element, the respective known feature hit list(s) is updated with the appropriate known feature hits as obtained from the known feature data output overlay of FIG. 17. For this example, the cluster containing data elements (1, 1), (2, 1), (1, 2), and (2, 2) records one hit for KF1 at data element (1, 1) and one hit for KF3 at data element (1, 2). The cluster containing data elements (3, 1), (4, 1), (5, 1), (3, 2), (4, 2), and (5, 2) records one hit each for KF1 at data element (4, 2) and (5, 2), one hit each for KF2 at data elements (4, 1) and (5, 2), and one hit for KF3 at data element (3, 2). Since processing wave 3 includes evaluation of CF1, which is comprised only of known feature members (i.e., KF1, KF2, KF3), the compound feature hit lists remain empty. Preferably, this process is repeated for each valid data element in the data selection.

Once all valid data elements with a given cluster range are evaluated for known and/or compound feature hits, the respective hit list(s) is processed. For a given cluster range, the total hit weight value for CF1 is initialized to zero, and then the members are analyzed individually. For this example, the cluster containing data elements (1, 1), (2, 1), (1, 2), and (2, 2) records one hit for KF1 at data element (1, 1). However, this hit count of one is not greater than or equal to the KF1 cluster count value of one, which requires at least two hits for KF1 within the CF1 cluster range of one; as such, member KF1 is assigned a hit weight value equal to (−100). This cluster also contains a hit for KF3 at data element (1, 2). However, since member KF3 is negated, and this hit count of one is not less than the KF3 cluster count value of zero, member KF3 is also assigned a hit weight value equal to (−100). Analysis of the CF1 associated logical base operator AND with regard to members KF1 and KF3 reveals no hit for CF1 for the cluster associated with valid data element (1, 1) since the total member hit weight value is not greater than zero (i.e. (−100)+(−100)=(−200)). In one instance, queue processing of wave 3 continues for the remaining valid data elements in the data selection.

FIGS. 20A-20C show an example data table representing the results of compound feature queue processing wave 3. In this example, hits for CF1 are recorded at valid data elements (5, 2), (1, 4), (1, 5), and (2, 5), and these are stored in the temporary compound feature data output overlay.

Figure 21:
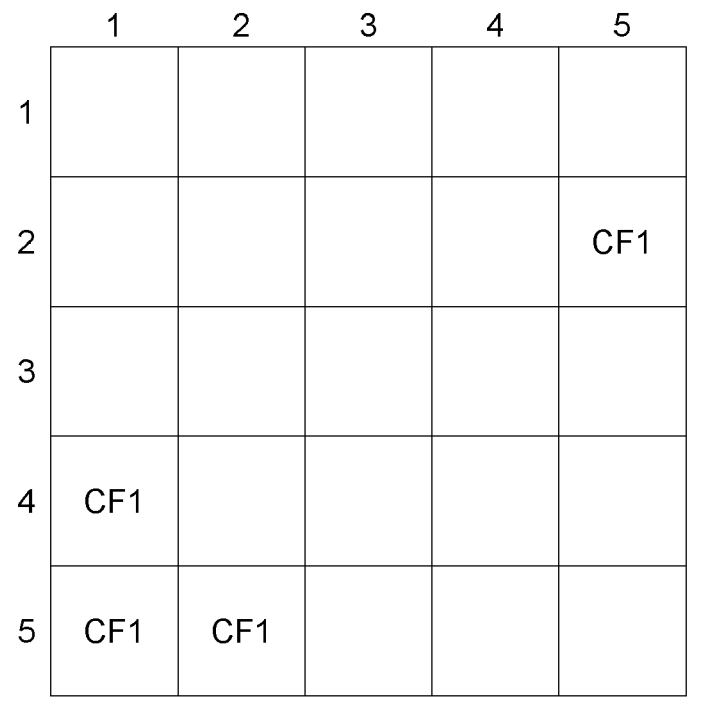

FIG. 21 shows an example data array representing one embodiment of the temporary compound feature data output overlay as it exists after the completion of compound feature queue processing wave 3.

In one instance, following the completion of compound feature queue processing wave 3, the method continues with the next processing wave 2. For this example, processing wave 2 includes evaluation of CF2 with a cluster range value of two. For each compound feature cluster range of the given processing wave (i.e., cluster range value of two for processing wave number 2), the known feature and compound feature hit lists are initialized to zero for each data element in the data set selection. A determination is then made as to whether any compound feature members (i.e., CF1, KF4, KF5, or KF6 for CF2) hit at the given data elements. For this example, data elements (1, 1), (4, 1), (3, 2), (5, 2), (2, 3), (1, 4), (3, 4), (4, 4), (1, 5), (2, 5), and (5, 5) are deemed "valid" for compound feature processing as each records at least one hit for either CF1, KF4, KF5, or KF6. Once the valid data elements are determined, the surrounding data elements, which fall within two data elements in each applicable direction and dimension of the valid data elements, are surmised. For this example, data elements (2, 1), (3, 1), (1, 2), (2, 2), (3, 2), (1, 3), (2, 3), and (3, 3) lay within the CF2 cluster range of valid data element (1, 1); data elements (2, 1), (3, 1), (5, 1), (2, 2), (3, 2), (4, 2), (5, 2), (2, 3), (3, 3), (4, 3), and (5, 3) lay within the CF2 cluster range of valid data element (4, 1); etc.

In one instance, for each data element within the current cluster range of a given valid data element, the respective known feature hit lists are updated with the appropriate known feature hits as obtained from the known feature data output overlay of FIG. 17. For this example, the cluster containing data elements (1, 1), (2, 1), (3, 1), (1, 2), (2, 2), (3, 2), (1, 3), (2, 3), and (3, 3) records one hit for KF4 at data element (1, 1), one hit for KF5 at data element (2, 3), and one hit each for KF6 at data elements (1, 1) and (3, 2). Moreover, the compound feature hit lists are updated with the respective compound feature hits as obtained from the temporary compound feature data output overlay of FIG. 21. For this example, the cluster records no hits for CF1. Preferably, this process is repeated for each valid data element in the data set selection.

Once all valid data elements within a given cluster range are evaluated for known and/or compound feature hits, the respective hit lists are processed. For a given cluster range, the total hit weight value for CF2 is initialized to zero, and then the members are analyzed individually. For this example, the cluster containing data elements (1, 1), (2, 1), (3, 1), (1, 2), (2, 2), (3, 2), (1, 3), (2, 3), and (3, 3) records one hit for KF4 at data element (1, 1). Since this hit count of one is greater than or equal to the KF4 cluster count value of zero, which requires at least one hit for KF4 within the CF2 cluster range value of two, the hit weight value of member KF4 is set to 100, which is previously assigned. The cluster also contains one hit for KF5 at data element (2, 3). Since this hit count of one is greater than or equal to the KF5 cluster count value of zero, which requires at least one hit for KF5 within the cluster range value of two, the hit weight value of member KF5 is set to 50, which is previously assigned. The cluster also contains one hit each for KF6 at data elements (1, 1) and (3, 2). Since this hit count of two is greater than or equal to the KF6 cluster count value of one, which requires at least two hits for KF6 within the cluster range of two, the hit weight value of member KF6 is set to 50, which is previously assigned. Analysis of the CF2 associated logical base operator OR with regard to members KF4, KF5, and KF6 reveals a single hit for CF2 at the respective cluster for valid data element (1, 1) since the total member hit weight value is greater than zero (i.e., 100+50+50=200). In one instance, queue processing of wave 2 continues for the remaining valid data elements in the data set selection.

FIGS. 22A-22E show an example data table representing the results of compound feature queue processing wave 2. In this example, hits for CF2 are recorded at valid data elements (1, 1), (4, 1), (3, 2), (5, 2), (2, 3), (1, 4), (3, 4), (4, 4), (1, 5), and (2, 5), and these are stored in the temporary compound feature data output overlay.

FIG. 23 shows an example data array representing one embodiment of the temporary compound feature data output overlay as it exists after the completion of compound feature queue processing waves 3 and 2.

In one instance, following the completion of compound feature queue processing wave 2, the method continues with the next processing wave 1. For this example, processing wave 1 includes evaluation of CF3 with a cluster range value of one. For each compound feature cluster range of the given processing wave (i.e., cluster range value of one for processing wave number 1), the known and compound feature hit lists are initialized to zero for each data element in the data set selection. A determination is then made as to whether any compound feature members (i.e., CF2 or KF3 for CF3) hit at the given data elements. For this example, data elements (1, 1), (4, 1), (1, 2), (3, 2), (5, 2), (2, 3), (3, 3), (1, 4), (3, 4), (4, 4), (1, 5), and (2, 5) are deemed "valid" for compound feature processing as each records at least one hit for either CF2 or KF3. Once the valid data elements are determined, the surrounding data elements, which fall within one data element in each applicable direction and dimension of the valid data elements, are surmised. For this example, data elements (2, 1), (1, 2), and (2, 2) lay within the CF3 cluster range value of valid data element (1, 1); data elements (3, 1), (5, 1), (3, 2), (4, 2), and (5, 2) lay within the CF3 cluster range value of valid data element (4, 1); etc.

In one instance, for each data element within the current cluster range of a given valid data element, the respective known feature hit lists are updated with the appropriate known feature hits as obtained from the known feature data output overlay of FIG. 17. For this example, the cluster containing data elements (1, 1), (2, 1), (1, 2), and (2, 2) records one hit for KF3 at data element (1, 2). Moreover, the compound feature hit lists are updated with the respective compound feature hits as obtained from the temporary compound feature data output overlay of FIG. 23. For this example, the cluster records one hit for CF2 at data element (1, 1). Preferably, this process is repeated for each valid data element in the data set selection.

Once all valid data elements within a given cluster range are evaluated for known and/or compound feature hits, the respective hit lists are processed. For a given cluster range, the total hit weight value for CF3 is initialized to zero, and then the members are analyzed individually. For this example, the cluster containing data elements (1, 1), (2, 1), (1, 2), and (2, 2) records one hit for KF3 at data element (1, 2). Since this hit count of one is greater than or equal to the KF3 cluster count value of zero, which requires at least one hit for KF3 within the cluster range of one, the hit weight value of member KF3 is set to 100, which is previously assigned. The cluster also contains one hit for CF2 at data element (1, 1). Since, this hit count of one is not greater than or equal to the CF2 cluster count value of one, which requires at least two hits for CF2 within the cluster range of one, the hit weight value of member CF2 is set to (−100). Member CF2 is not evaluated against the logical base operator XOR since its hit weight value is less than or equal to zero. Analysis of member KF3 with the associated logical base operator reveals a hit for CF3 at a given cluster for valid data element (1, 1) since the total member hit weight value is equal to 100. In one instance, queue processing of wave 1 continues for the remaining valid data elements in the data set selection.

FIGS. 24A-24C show an example data table representing the results of compound feature queue processing wave 1. In this example, hits for CF3 are recorded at valid data elements (1, 1), (5, 2), (1, 4), (1, 5), and (2, 5), and these are stored in the main compound feature data output overlay.

Figure 25:
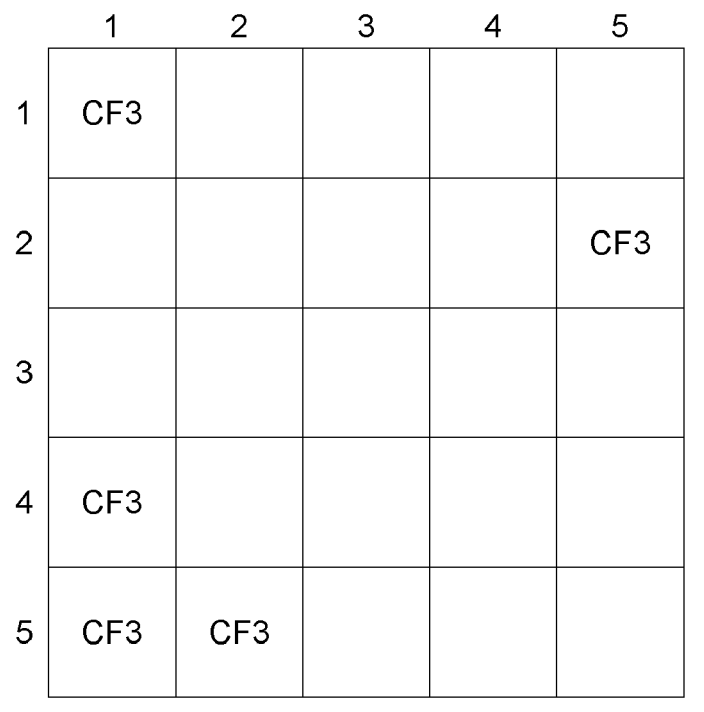

FIG. 25 shows an example data array representing one embodiment of the main compound feature data output overlay as it exists after completion of compound feature processing waves 3, 2, and 1.

For further illustrative purposes, the following example represents one embodiment of a data analysis and feature recognition system that is used to accomplish compound feature creation, processing, and identification; specifically, one employment of said system is used to show the unique identification of shoreline, which is the abstract location existing where a body of water meets a land mass.

In one embodiment, compound feature creation and processing first requires the creation, training, and storage of pluralities of known features into an acceptable storage structure using any acceptable data analysis and feature recognition system, such as disclosed by Brinson, et al., in U.S. patent application 2007/0244844 or as accomplished using any acceptable user-specified, preset, or automatically determined system or method intended for use in the same or similar manner. For this example, a set of known features, including "Forest," "Land," "Shoreline Known," "Vegetation," and "Water," have been created, trained, and stored as occurring within a two-dimensional, satellite image of a small bridge connecting two landmasses that are traversed by a river (hereafter "Image 1").

In one instance and following known feature creation, editing, training, and storage, one or pluralities of compound features are created and their associated properties are edited.

These compound feature properties may include, inter alia, a name; an associated logical base operator (i.e., AND, OR, XOR); a method for compound feature processing, which may or may not be set to stop processing upon the first found occurrence of the compound feature; a method for known feature processing, which controls whether the compound feature members, specifically the known feature members, are evaluated based solely upon the known feature trained most often or upon any known feature(s) trained for a given data element since it is possible for multiple known features to be identified at any given data element of the data set or selection therein; the compound feature cluster range value, which defines how far, in each applicable direction and dimension, from where a compound feature member is identified that another member(s) of the same compound feature must be located in order for the compound feature to hit for the given data element; and the compound feature action-on-detection, which activates when an explicitly selected compound feature is positively identified for a given data element and can include, inter alia, painting one or pluralities of data elements a user-specified, preset, or automatically determined color, playing a user-specified, preset, or automatically determined sound, executing no action, etc. Preferably, this process for compound feature creation and editing is repeated for all created compound features.

For this example, compound feature "Shoreline 1" is created and associated with the logical base operator AND; the method for compound feature processing is set to not stop upon the first found occurrence of said compound feature in the data set or selection therein; the method for known feature processing is optionally set to use the known feature trained most often to a given data element; the cluster range value is set to one for all applicable directions and dimensions (i.e., the X-dimension and the Y-dimension for a two-dimensional image); and the feature action-on-detection is set to paint one or pluralities of activated data elements a user-specified color.

A compound feature member is any logically associated known feature(s) and/or sub-compound feature(s) that comprises a given parent compound feature. For each new compound feature created, the previously created members are user-specified, preset, or automatically determined, and their associated properties set. For this example, compound feature "Shoreline 1" is comprised of previously created known feature "Water" and previously created compound feature "Not Water," which includes previously created known features "Forest," "Vegetation," and "Land." In addition, pluralities of other compound features are also created and edited; these compound features include: "Forest and Water," which is comprised of the known features "Forest" and "Water"; "Not Water," which is comprised of the known features "Forest," "Vegetation," and "Land"; "Vegetation and Water," which is comprised of the known features "Vegetation" and "Water"; and "Water and Land," which is comprised of the known features "Water" and "Land."

In one instance, the compound feature member properties can be modified at this point during compound feature creation. Each compound feature member can be associated with a hit weight value, a cluster count value, and/or a negate sub-operator attribute. These member properties, if any, modify the operation of the member to affect the positive activation of the compound feature. In an alternate embodiment, any or all of these compound feature member properties can be omitted.

Once the compound features are created and the respective members defined, Image1 can be processed for identification of any previously defined known and/or compound features; for this example, Image1 is processed for the identification of compound feature "Shoreline 1."

Each compound feature is associated with a default processing option, which is previously set during compound feature creation/editing, but this setting can be overridden by designating how the compound feature members are to be processed. The processing options available include (1) use of no override (i.e., default to the original processing option); (2) process only the most significant known feature for a given data element whereby the data output overlay contains only the most significant known feature processed for each data element; (3) use only the most significant known feature present for a given data element whereby the data output overlay contains all known features present for each data element but only reports the most significant known feature present for each; or (4) use all known features present for a given data element whereby the data output overlay contains and reports all known features present for each data element.

Regarding processing option (1), "no override," the compound feature is set to process in the default mode with no override mechanism activated. The member known feature(s) of the explicitly selected compound feature (i.e., "Shoreline 1") is processed according to the discretion of the compound feature and the known features themselves.

Regarding processing option (2), "process most significant known feature," the compound feature is set to process its member features at the "most-significant-known-feature-only" level. In this most restrictive case of compound feature processing, all known features and compound features are affected because the known feature data output overlay, which relays every known feature detected for a given data element(s), contains only the most significant known feature hit for any given data element; thus, no less-significant known features are available for consideration. In one instance, the significance is increased if a particular known feature is trained more often to a particular algorithmically determined data value than any of the other known features. This specific compound feature processing option overrides all other settings associated with a particular compound feature. For example, assume KF1, KF2, and KF3 are all associated with a particular algorithmically determined data value where KF1 is more significant for the data value than KF2, and KF2 is more significant for the data value than KF3. KF2 and KF3 are included in the compound feature processing selection, and as such, the associated results are stored in the known feature data output overlay. However, KF1 is not processed and effectively does not exist to the known feature data output overlay. As such, any data element that resolves to KF1 never reports a known feature hit since KF1 is the most significant known feature for the given data element value, but KF1 is not processed or stored in the known feature data output overlay.

Regarding processing option (3), "use most significant known feature," the compound feature is set to use only the most significant known feature stored in the known feature data output overlay during processing. In this less restrictive instance of compound feature processing, the known feature data output overlay contains all known feature hits, but processing of the selected compound feature(s) ignores all but the most significant known feature present for a given data element. Unselected sub-compound features remain unaffected by this processing option. In contrast to the processing option wherein only the most significant known feature is processed, in this case only the most significant known features in the current processing run are included even though all are present in the known feature data output overlay. For example, assume KF1, KF2, and KF3 are each associated with a particular algorithmically ascertained data value where KF1 is the most significant for the data value, followed by KF2, and finally by KF3. KF2 and KF3 are included in compound feature processing, and as such, the associated hits are stored in the known feature data output overlay. KF1 is not processed and does not exist to the known feature data output overlay. In this case, compound feature processing reveals a hit for KF2 since it is the more significant of the two known features processed during this particular compound feature processing wave and is present for the particular data value in the known feature data output overlay. In this instance of compound feature processing, restrictions loosen from yielding no hits for a known feature after processing to yielding hits for KF2 only.

Finally regarding processing option (4), "use all known features," the compound feature is set to consider all known feature hits during processing as the known feature data output overlay contains a record of all known feature hits for each data element of the data set or selection therein. Unselected sub-compound features remain unaffected by this processing option. For example, KF1, KF2, and KF3, in order from most to least significant with respect to the given data value, are each associated with a particular algorithmically ascertained data value. KF2 and KF3 are included in compound feature processing, and as such, the associated hits are stored in the known feature data output overlay. KF1 is not processed and does not exist to the known feature data output overlay. In this case, compound feature processing reveals that both KF2 and KF3 are available to hit at a given data element since both are stored in the known feature data output overlay.

In addition to the compound feature processing attribute, the user can optionally override the previously set compound feature cluster range values corresponding to any relevant dimension and can modify the respective cluster count values.

Figure 26:
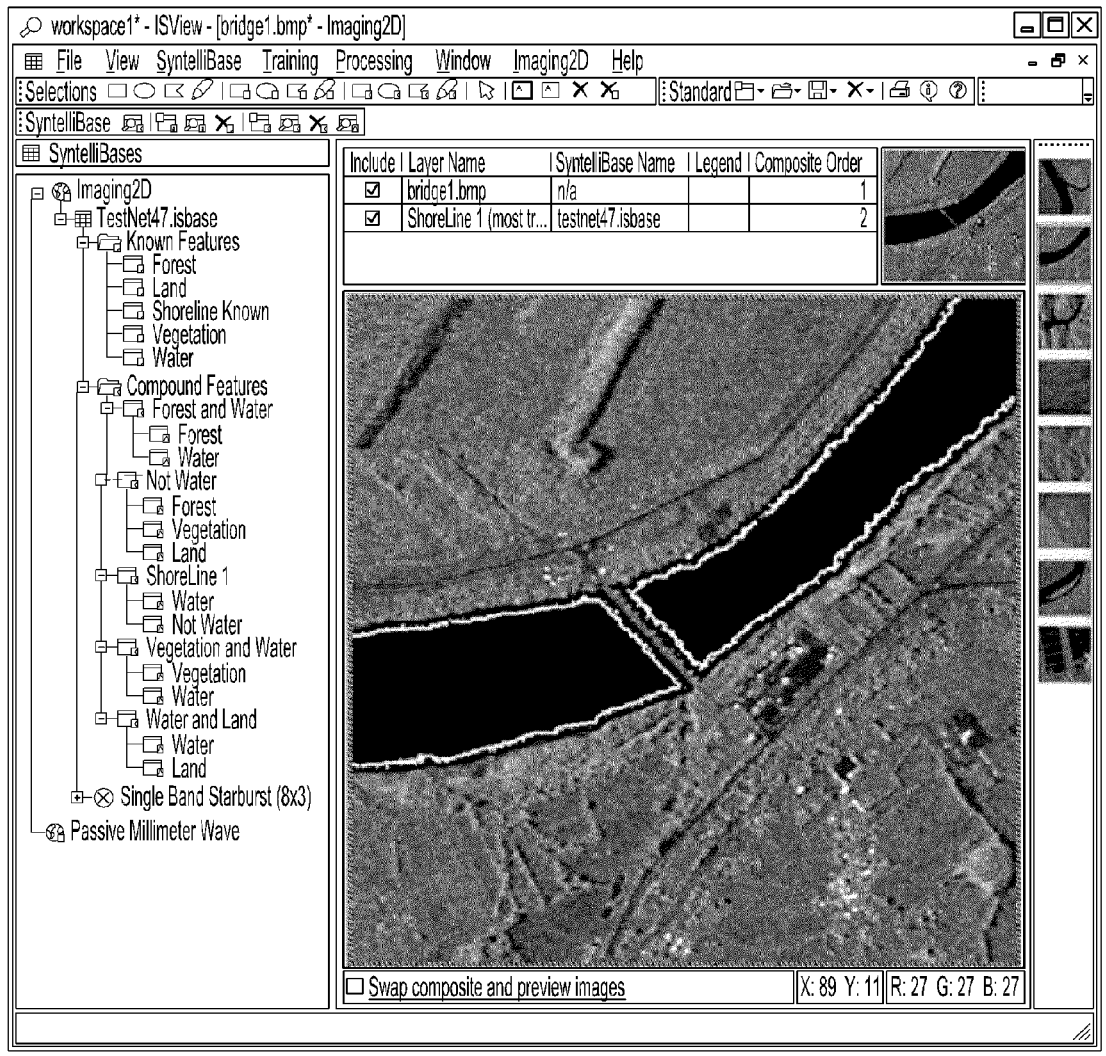
FIG. 26 is a screenshot showing an application for compound feature creation, processing, and identification with the compound feature "Shoreline 1" identified and presented to the user via the feature action-on-detection paint.

FIG. 26 is a screenshot showing one embodiment of user-interface for a data analysis and feature recognition system that is used to accomplish compound feature creation, processing, and use; infinite alternatives exist. In this instance, the application contains a menu bar, which is known in the art; a set of icons; a workspace, which displays one or a set of images that a user can use to train a datastore(s) and identify different features; and an area to review multiple datastores (i.e., "SyntelliBases"). For this example, the workspace is loaded with an image of interest (i.e., Image1), which is previously described. Also, the data elements within Image1 that have been identified as compound feature "Shoreline 1" are located along the river's edge and are painted white; for this example, compound feature "Shoreline 1" is identified at 3,308 data elements of Image1. The area directly above the workspace lists the layers (i.e., processed compound feature "Shoreline 1") that are currently available for viewing. To the left of the workspace is an area in which to review one or pluralities of datastores (e.g., "TestNet47.isbase") and their associated known and/or compound features, and to the right is a gallery where all media currently opened in the application are displayed. Mouse position and color values are shown in the lower right corner of the screen and are based upon the cursor location as is common in the art.

While the preferred embodiment of the present invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention, in which exclusive property or privilege is claimed, are defined as follows:

1. A system for compound feature determination, comprising:
 a computer having a processor and a memory, the memory having a database of known features associated with the compound feature;
 the memory further containing stored programming instructions operable by the processor to determine whether the compound feature is present for a given data element within a data set, the presence of the compound feature being a function of a Boolean logical operator association between a plurality of known features associated with the compound feature wherein the stored programming instructions further enable the processor to determine the presence of the compound feature as a function of a plurality of hit weight values, each one of the plurality of hit weight values being assigned to a corresponding one of the plurality of known features, wherein the compound feature is determined to be present if the sum of the hit weights is equal to or greater than a user-defined threshold for the Boolean operation.

2. The system of claim 1, wherein the stored programming instructions further enable the processor to determine the presence of the compound feature as function of the presence of the known features over a cluster distance extending from the data element in one or more directions.

3. The system of claim 2, wherein the cluster distance is independently user-adjustable for each of the one or more directions.

4. The system of claim 2, wherein the cluster distance must extend in one or more predefined directions from the data element in order to determine that the compound feature is present.

5. The system of claim 1, wherein each of the plurality of hit weight values is user-adjustable.

6. The system of claim 1, wherein the stored programming instructions further enable the processor to determine the presence of the compound feature as a function of a cluster count value, the cluster count value representing the number of times within the range of cluster values in which the compound feature is determined to be present.

7. The system of claim 6, wherein each of the plurality of hit weight values is user-adjustable.

8. The system of claim 7, wherein the Boolean operators comprise one or more of AND, OR, XOR, and NOT.

9. The system of claim 7, wherein the stored programming instructions further enable to processor to provide a notification to a user when a compound feature is determined to be present.

10. The system of claim 9, wherein the known features within the database are associated with a visual image and the notification to the user comprises presenting a modified representation of the visual image wherein the modified representation includes an indication of the compound feature.

11. The system of claim 1, wherein one or more of the known features associated with the compound feature further comprise one or more additional compound features, whereby the one or more additional compound features are associated with the compound feature.

12. A computer-based method for compound feature determination, comprising:
 providing a computer having a processor and a memory, the memory having a database of known features associated with the compound feature and a data set to be analyzed for the presence of the compound feature; and processing data within a stored data set, via the computer, to determine whether the compound feature is present for a given data element within the data set, the presence of the compound feature being a function of a Boolean logical operator association between a plurality of known features associated with the compound feature wherein the step of processing is performed as a function of a plurality of hit weight values, each one of the plurality of hit weight values being assigned to a corresponding one of the plurality of known features, wherein the compound feature is determined to be present if the sum of the hit weights is equal to or greater than a user-defined threshold for the Boolean operation.

13. The system of claim 12, wherein the step of processing occurs over a cluster distance extending from the data element.

14. The system of claim 12, wherein the step of processing is performed as a function of a cluster count value, the cluster count value representing the number of times within the cluster distance in which the compound feature is determined to be present.

15. A system for compound feature determination, comprising:
a computer having a processor and a memory, the memory having a database of known features associated with the compound feature;
the memory further containing stored programming instructions operable by the processor to:
analyze a data element within a data set stored in the memory to determine the presence of a plurality of known features from the database of known features to produce a plurality of known feature results;
compare the plurality of known feature results via a Boolean logical operation; and
determine whether the compound feature is present as a function of the Boolean logical operation wherein the stored programming instructions further enable the processor to apply a plurality of hit weight values to the plurality of known feature results, each one of the plurality of hit weight values being assigned to a corresponding one of the plurality of known features wherein the compound feature is determined to be present if the sum of the hit weights is equal to or greater than a user-defined threshold for the Boolean operation.

16. The system of claim 15, wherein the stored programming instructions further enable the processor to perform the steps of analyzing, comparing, and determining repeatedly over a cluster distance extending from the data element.

17. The system of claim 15, wherein the stored programming instructions further enable the processor to determine the presence of the compound feature as a function of a cluster count value, the cluster count value representing the number of times within the cluster distance in which the compound feature is determined to be present.

* * * * *